US 11,423,802 B2

(12) United States Patent
Chan et al.

(10) Patent No.: US 11,423,802 B2
(45) Date of Patent: Aug. 23, 2022

(54) EDUCATIONAL CLOCK

(71) Applicant: hand2mind, Inc., Vernon Hills, IL (US)

(72) Inventors: Andy Chan, Hong Kong (CN);
Brittany Goerig, Midlothian, TX (US);
Jared Ganrude, Arlington Heights, IL (US); Elana Woldenberg, Chicago, IL (US)

(73) Assignee: hand2mind, Inc., Vernon Hills, IL (US)

( * ) Notice: Subject to any disclaimer, the term of this patent is extended or adjusted under 35 U.S.C. 154(b) by 416 days.

(21) Appl. No.: 16/629,929

(22) PCT Filed: Oct. 10, 2019

(86) PCT No.: PCT/CN2019/110261
§ 371 (c)(1),
(2) Date: Jan. 9, 2020

(87) PCT Pub. No.: WO2021/068146
PCT Pub. Date: Apr. 15, 2021

(65) Prior Publication Data
US 2021/0358328 A1 Nov. 18, 2021

(51) Int. Cl.
*G09B 19/12* (2006.01)
*G04B 19/06* (2006.01)
(52) U.S. Cl.
CPC .......... *G09B 19/12* (2013.01); *G04B 19/065* (2013.01)
(58) Field of Classification Search
CPC ......... G09B 19/12; G04B 1/08; G04B 19/065
See application file for complete search history.

(56) References Cited

U.S. PATENT DOCUMENTS

| 682,912 A | 9/1901 | Castner |
| 1,816,760 A | 7/1931 | Barnowitz |
| (Continued) | | |

FOREIGN PATENT DOCUMENTS

| CN | 202205032 U | 4/2012 |
| CN | 304354670 | 11/2017 |
| CN | 304927752 | 12/2018 |

OTHER PUBLICATIONS

Cpalms, "Number Line Clock Directives" [retrieved on May 29, 2020 from http://www.cpalms.org/uploads/resources//44544/Number_Line_Clock_Directions.pdf, available prior to Oct. 10, 2019] (3 pages).

(Continued)

Primary Examiner — Edwin A. Leon
Assistant Examiner — Jason M Collins
(74) Attorney, Agent, or Firm — Michael Best & Friedrich LLP

(57) ABSTRACT

An educational clock that includes a base, a minute number line chain including a plurality of minute links pivotably connected together, and an hour number line chain including a plurality of hour links pivotably connected together. The minute number line chain is adjustable between an annular shape configured to removably couple to the base and a linear shape. The hour number line chain is adjustable between an annular shape configured to removably couple to the base concentrically with the minute number line chain and a linear shape. The minute number line chain and the hour number line chain are approximately the same length when each is in its linear shape.

27 Claims, 30 Drawing Sheets

(56) References Cited

U.S. PATENT DOCUMENTS

| | | | |
|---|---|---|---|
| 2,430,599 A | 11/1947 | Batori | |
| 2,610,853 A | 9/1952 | Livingston | |
| D168,834 S | 2/1953 | Farinacci | |
| 3,001,301 A | 9/1961 | Carl | |
| D205,401 S | 8/1966 | Schmoyer | |
| 3,526,045 A | 9/1970 | Ston | |
| 3,597,918 A * | 8/1971 | Robinson | G04C 23/08 |
| | | | 968/609 |
| 3,645,087 A * | 2/1972 | Rams | G04B 19/20 |
| | | | 968/162 |
| 3,852,949 A * | 12/1974 | Sayler | G04B 19/264 |
| | | | 368/76 |
| 3,956,879 A * | 5/1976 | Bailey | G04B 19/207 |
| | | | 368/76 |
| D242,877 S | 12/1976 | Bologna | |
| 4,103,484 A * | 8/1978 | Bailey | G04B 19/04 |
| | | | 368/76 |
| D269,977 S | 8/1983 | Gopfert | |
| 4,682,955 A | 7/1987 | Wada | |
| 4,808,111 A | 2/1989 | Pratt | |
| D308,698 S | 6/1990 | Dorman | |
| 5,030,104 A | 7/1991 | Caldwell | |
| 5,299,178 A | 3/1994 | Belik | |
| D350,772 S | 9/1994 | King | |
| D386,927 S | 12/1997 | Meade | |
| 5,851,118 A | 12/1998 | Woldenberg et al. | |
| D404,435 S | 1/1999 | Gagnon | |
| D419,617 S | 1/2000 | Wise et al. | |
| 6,354,841 B1 | 3/2002 | Brandt | |
| D462,391 S | 9/2002 | Allen | |
| D529,961 S | 10/2006 | Gallagher | |
| 7,534,106 B1 | 5/2009 | Dutcher et al. | |
| 8,355,297 B2 * | 1/2013 | Wilbur | G04C 17/0016 |
| | | | 368/78 |
| 8,611,192 B2 | 12/2013 | Balter et al. | |
| 2006/0014127 A1 | 1/2006 | Lin | |
| 2009/0081625 A1 | 3/2009 | Baerg | |
| 2020/0117145 A1 * | 4/2020 | Monferrer | G04C 17/0091 |

OTHER PUBLICATIONS

Georgia Department of Education, Georgia Standards of Excellence Framework, GSE Understanding Measurement, Length, and Time, Unit 3 [retrieved from https://www.georgiastandards.org/Georgia-Standards/Frameworks/2nd-Math-Unit-3.pdf, available prior to Oct. 10, 2019] (99 pages).

Learning Resources, "Big Time™ Student Clock" [retrieved on May 29, 2020 from https://web.archive.org/web/20170705182501/https://www.learningresources.com/product/big+time-8482-+student+clock do? sortby=ourPicks&refType=&from=fn, available on Jul. 5, 2017 per Internet Archive Wayback Machine] (1 page).

Hand2mind, Magnetic Elapsed Time Set: [retrieved on Jun. 26, 2020 from https://web.archive.org/web/20170618232134/http://www.hand2mind.com/item/magnetic-elapsed-time-set/2478, available on Jun. 18, 2017 per Internet Archive Wayback Machine] (2 pages).

SMathSmarts, "Relating a Clock to a Number Line" [retrieved on May 29, 2020 from https://web.archive.org/web/20190320213155/http://smathsmarts.com/relating-a-clock-to-a-number-line/, available on Mar. 20, 2019 per Internet Archive Wayback Machine] (3 pages).

YouTube, "Circle a number line into a clock", <https://www.youtube.com/watch?v=Yw31gABRkoc>, published Feb. 11, 2014 (1 page).

International Search Report and Written Opinion for Application No. PCT/CN2019/110261 dated Jul. 10, 2020 (8 pages).

Learning Resources®, "Magnetic Elapsed Time Set," <https://www.learningresources.com/magnetic-elapsed-time-set, web page publicly available as early as May 22, 2020, representative copy filed with IDS was captured Jun. 2021 (3 pages).

Didax Educational Resources Number Line, Amazon.com,date published May 26, 2016, date retrieved from internet 4-22-22-https://amzn.to/36YsuXA (Year: 2016).

* cited by examiner

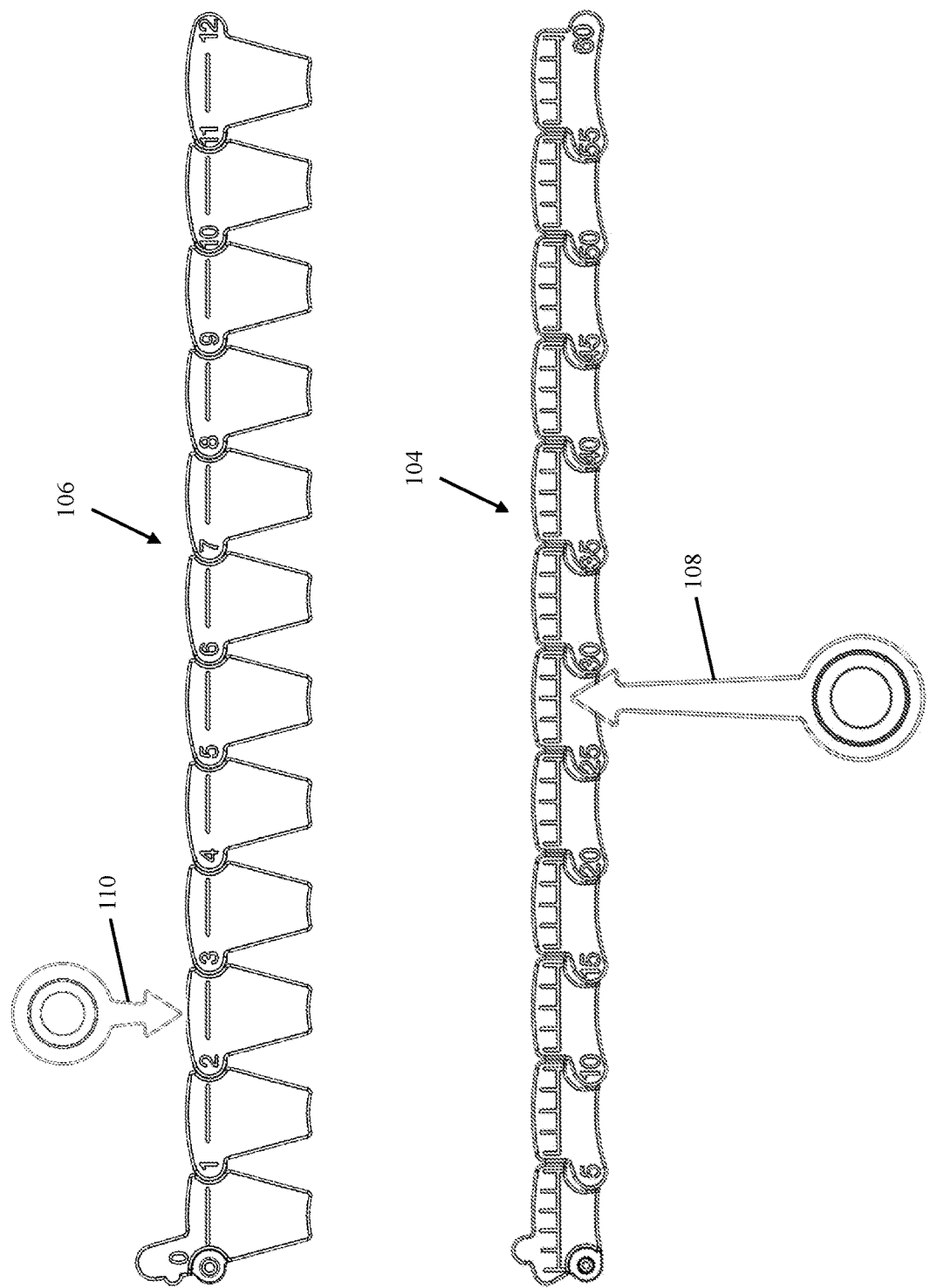

US 11,423,802 B2

EDUCATIONAL CLOCK

BACKGROUND

The present disclosure relates to an educational clock to teach children learn how to tell time.

SUMMARY

In some embodiments, the present disclosure relates to an educational clock that includes a base, a minute number line chain removably coupled to the base, and an hour number line chain removably coupled to the base concentrically with the minute number line chain. The minute number line chain has a plurality of minute links and a plurality of minute link pivot joints, each minute link pivotably connected to an adjacent minute link at a minute link pivot joint. The hour number line chain has a plurality of hour links and a plurality of hour link pivot joints, each hour link pivotably connected to an adjacent hour link at an hour link pivot joint. The minute link pivot joints and the hour link pivot joints are arranged on a common circle.

In some embodiments, the present disclosure relates to an educational clock that includes a base, a minute number line chain removably coupled to the base, and an hour number line chain removably coupled to the base. The minute number line chain has a plurality of minute links and a plurality of minute link pivot joints, each minute link pivotably connected to an adjacent minute link at a minute link pivot joint. The hour number line chain has a plurality of hour links and a plurality of hour link pivot joints, each hour link pivotably connected to an adjacent hour link at an hour link pivot joint. The minute number line chain and the hour number line chain are disposed concentrically and partially overlap each other, and the minute link pivot joints and the hour link pivot joints are located where the minute number line chain and the hour number line chain are overlapping.

The minute number line chain and the hour number line chain are disposed concentrically to each other and are partially overlapping with each other. The minute link pivot joints and the hour link pivot joints are arranged in portions of the minute number line chain and the hour number line chain, respectively, that are overlapping with each other.

In some embodiments, the present disclosure relates to an educational clock that includes a base, a minute number line chain including a plurality of minute links pivotably connected together, and an hour number line chain including a plurality of hour links pivotably connected together. The minute number line chain is adjustable between an annular shape configured to removably couple to the base and a linear shape. The hour number line chain is adjustable between an annular shape configured to removably couple to the base concentrically with the minute number line chain and a linear shape. The minute number line chain and the hour number line chain are approximately the same length when each is in its linear shape.

Other features and advantages of the present disclosure will become apparent by consideration of the following description and the appended claims when taken in connection with the accompanying drawings.

BRIEF DESCRIPTION OF THE DRAWINGS

FIG. 30 illustrates an exemplary arrangement of the minute number line chain and the hour number line chain of the educational clock of FIG. 1 for learning to tell time with hours and minutes.

DETAILED DESCRIPTION

Before any embodiments are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. It should be understood that the description of specific embodiments is not intended to limit the disclosure from covering all modifications, equivalents and alternatives falling within the spirit and scope of the disclosure as defined in the appended claims. Also, it is to be understood that the phraseology and terminology used herein is for the purpose of description and should not be regarded as limiting.

Figure 1:
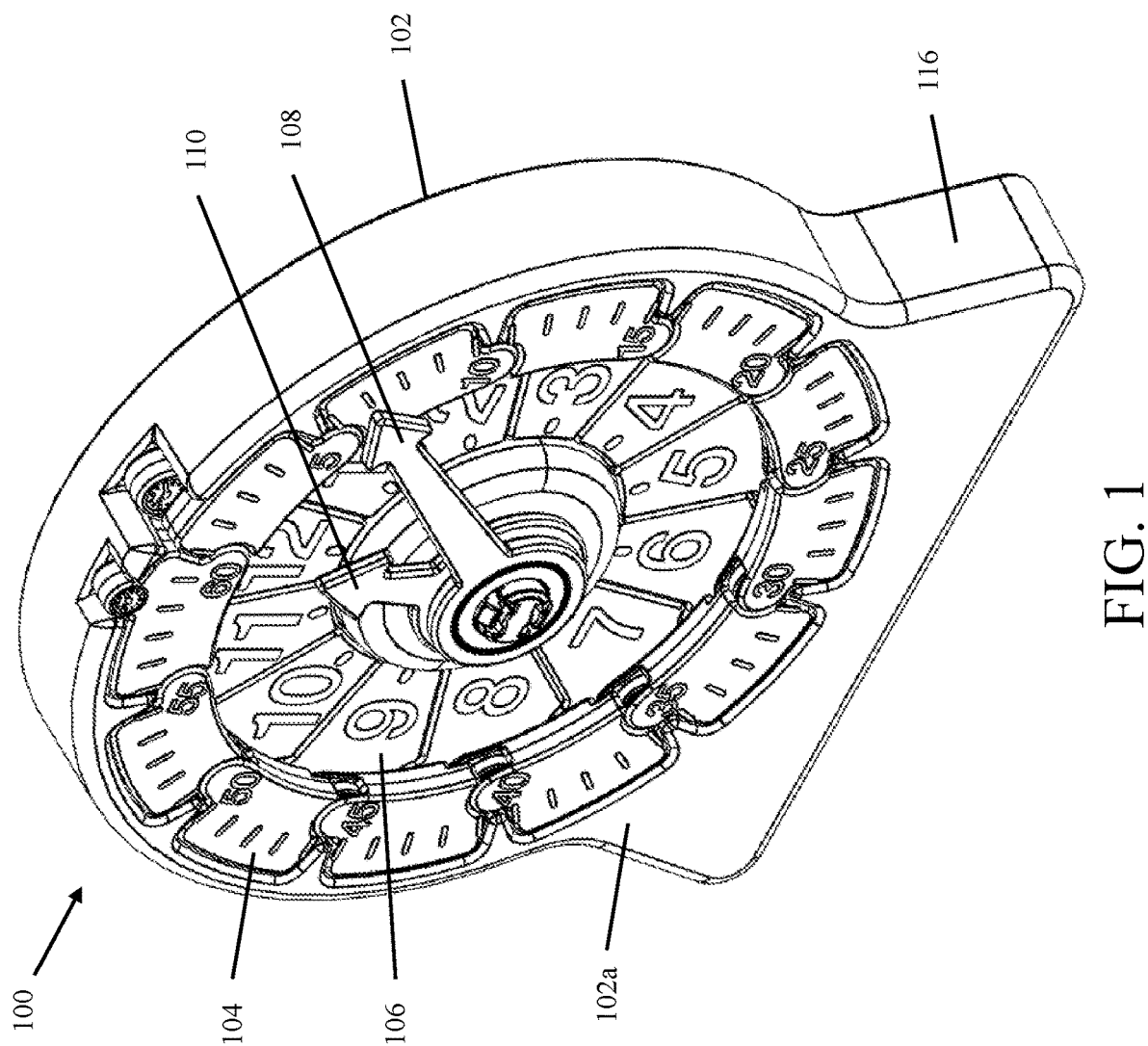
FIG. 1 is a perspective view of an educational clock, including a minute number line chain and an hour number line chain coupled to a base, in accordance with an embodiment of the present disclosure.
Figure 2:
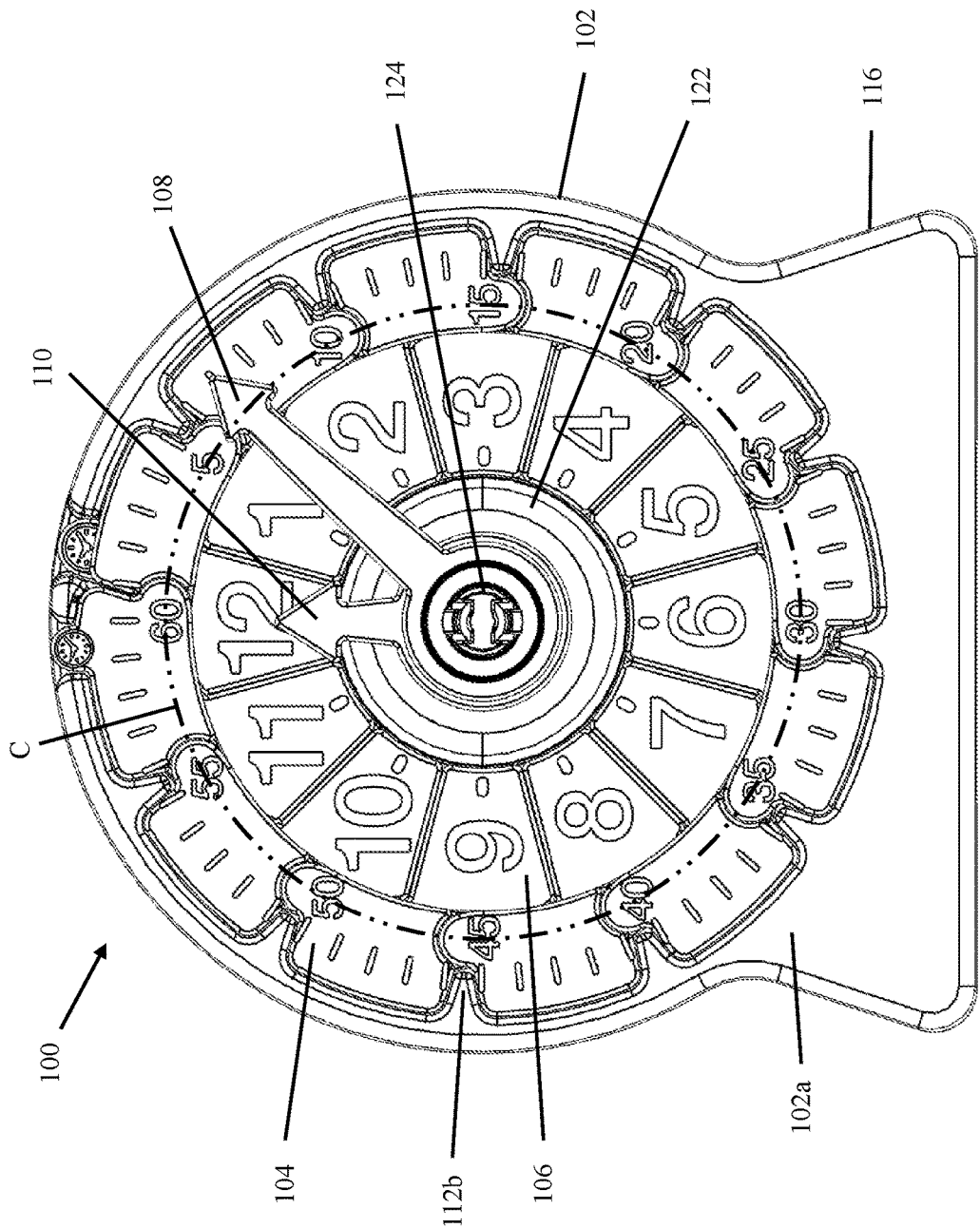
FIG. 2 is a front view of the educational clock of FIG. 1.
Figure 3:
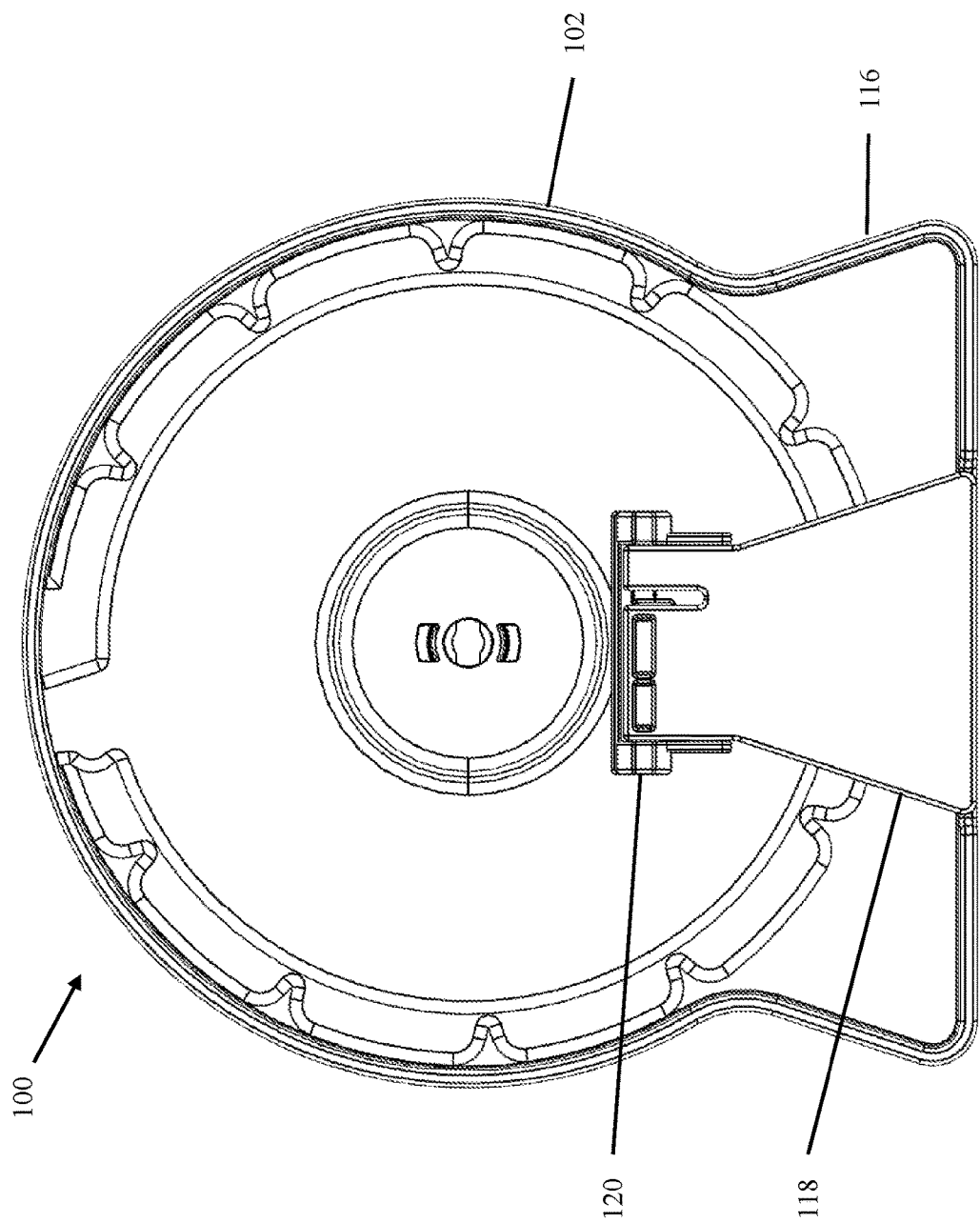
FIG. 3 is a rear view of the educational clock of FIG. 1.

Referring now to the figures, FIGS. 1-3 illustrates an embodiment of an educational clock 100 having a modular configuration, including a base 102 and first and second number line chains 104, 106 each removably coupled to the base 102. The first number line chain 104 corresponds to a minute indicia of the clock and the second number line chain 106 corresponds to an hour indicia of the clock. The first or minute number line chain 104 and the second or hour number line chain 106 each have an adjustable shape. More specifically, the minute number line chain 104 and the hour number line chain 106 can be arranged into concentric annular (including circular) shapes having spatially overlapping and non-overlapping portions from one another for coupling to the base 102 to be viewed as a clock, as shown in FIGS. 1-2, 6 and 17. When removed from the base 102, as shown in FIGS. 9-13 and 20-24, the minute number line chain 104 and the hour number line chain 106 each can be selectively arranged into substantially linear shapes having approximately the same length L as one another (as described below). The clock 100 also includes a minute hand 108 and an hour hand 110 that are each removably and rotatably coupled to the base 102.

The modular configuration of the clock 100 helps children understand the concept of time. For example, the modular configuration of the clock 100 allows teachers to teach the concept of telling time on an analog clock that represents time by the position of hands on a dial by showing children that the clock face may be an extension of a number line. By selectively adjusting the shape of the minute number line chain 104 and the hour number line chain 106 between an annular shape corresponding to a clock format and a substantially linear shape corresponding to a number line, children are able to better understand the circular format of a clock and its dual representation, i.e., one hour can also mean five minutes. As described in more detail below, this configuration allows children to physically and mentally connect concepts between a number line and time so as to more easily understand the concepts of measuring, reading, adding and subtracting time with an analog clock. By learning time from a number line, children are presented with a way to understand that time is a continuous unit of measurement. When arranged in an annular shape, the minute and hour number line chains 104 and 106 allow children to visualize the clock as circular number lines. When arranged in a linear shape, the minute and hour number line chains 104 and 106 may be approximately the same length. With this arrangement, children can more easily recognize the relationship between hours and minutes on a clock face, including that the distance traveled over a one-hour interval and the distance traveled over a five minute interval are the same. In this way, children can also better understand conventions of time keeping and the representation of time in a digital format, including its relationship to time in an analog format.

The Clock Base

With reference to FIGS. 1-5, the base 102 may be a unitary molded plastic piece having one or more recessed portions formed in a front surface 102a of the base 102 to receive the minute number line chain 104 and the hour number line chain 106 each configured in its annular shape. In the illustrated embodiment, the base 102 includes an outer recessed portion 112 and an inner recessed portion 114 that are substantially circular and concentric with each other.

The outer recessed portion 112 defines an annular region or seat of uniform depth for receiving thereon at least a portion of the minute number line chain 104 arranged in its annular shape. The outer circumferential edge portion 112a of the outer recessed portion 112 may be generally shaped and sized to match the outer peripheral shape and the outer diameter of the annular-shaped minute number line chain 104. In the illustrated embodiment, for example, the outer circumferential edge portion 112a of the outer recessed portion 112 includes a plurality of spaced fingers 112b that project radially inwardly and are received in complementary spaces formed between tiles (described in more detail below) of the annular-shaped minute number line chain 104. The depth of the outer recessed portion 112 relative to the front surface 102a of the base 102 may be substantially equal to the width w1 of the minute number line chain 104 (see FIG. 9), and thus the minute number line chain 104 can be seated in the outer recessed portion 112 substantially flush with the front surface 102a of the base 102.

Figure 4:
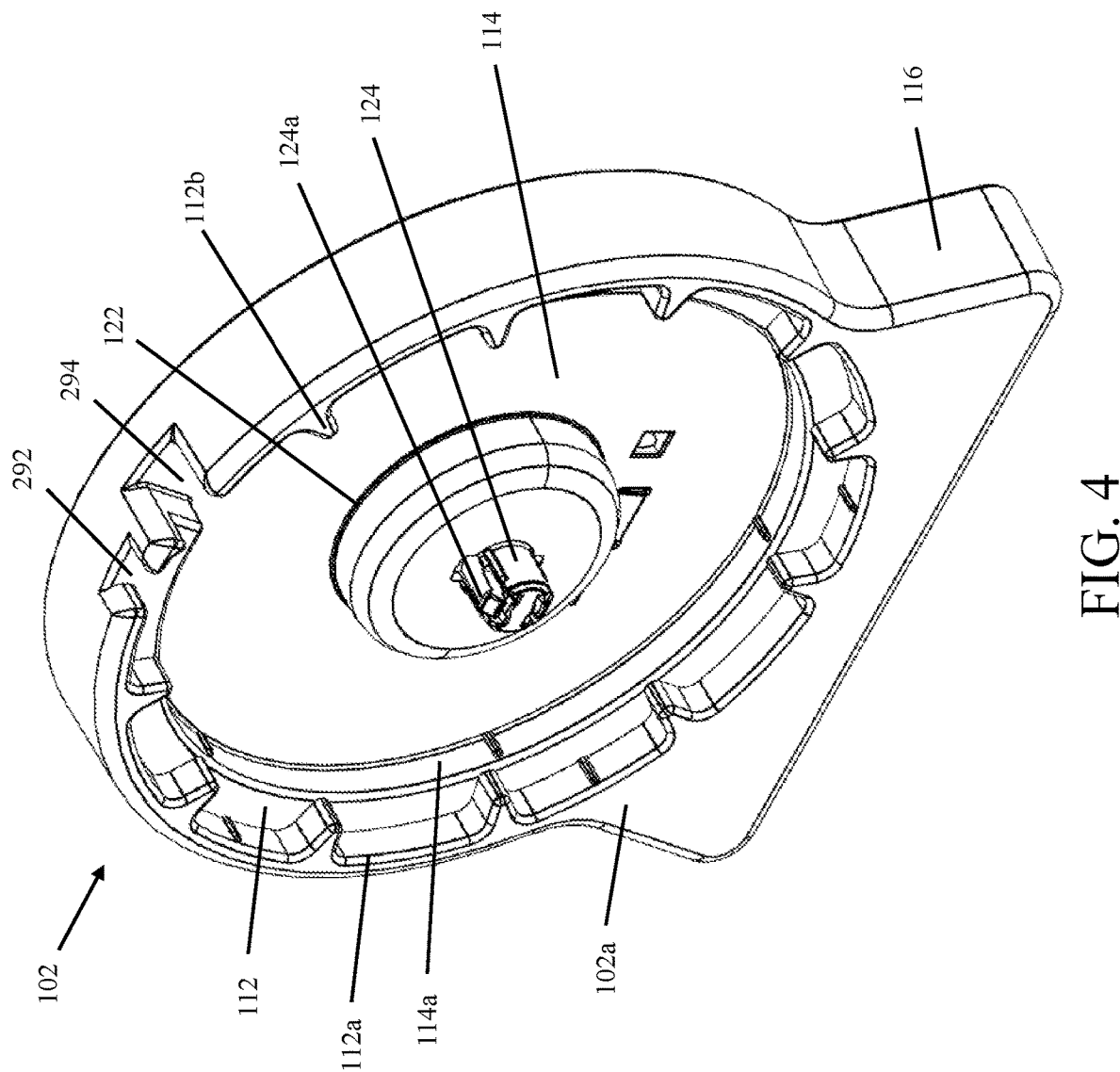
FIG. 4 is a perspective view of the base of the educational clock of FIG. 1.
Figure 5:
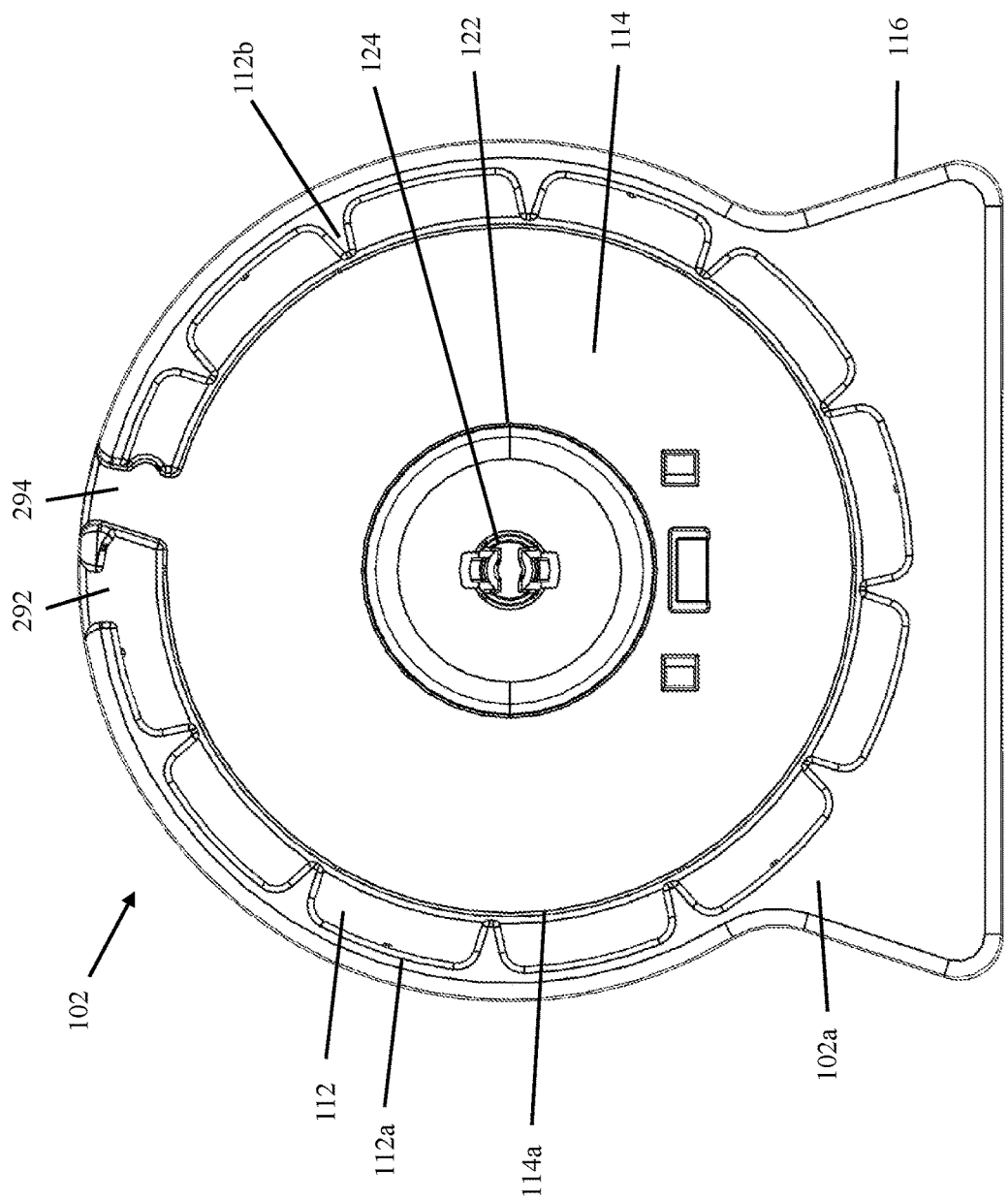
FIG. 5 is a front view of the base of FIG. 4.
Figure 6:
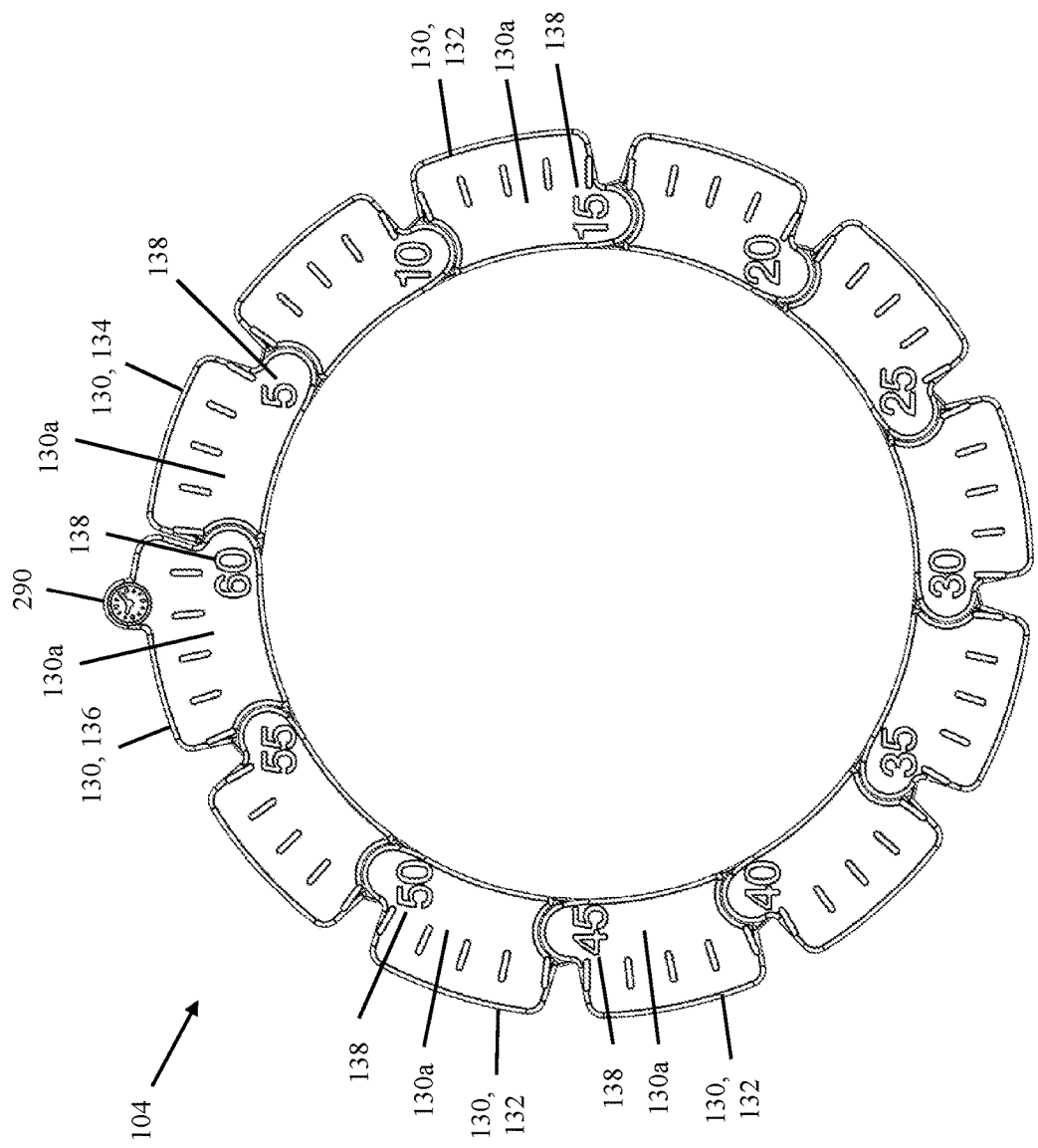
FIG. 6 is a front view of the minute number line chain of the educational clock of FIG. 1 arranged in its annular shape.
Figure 7:
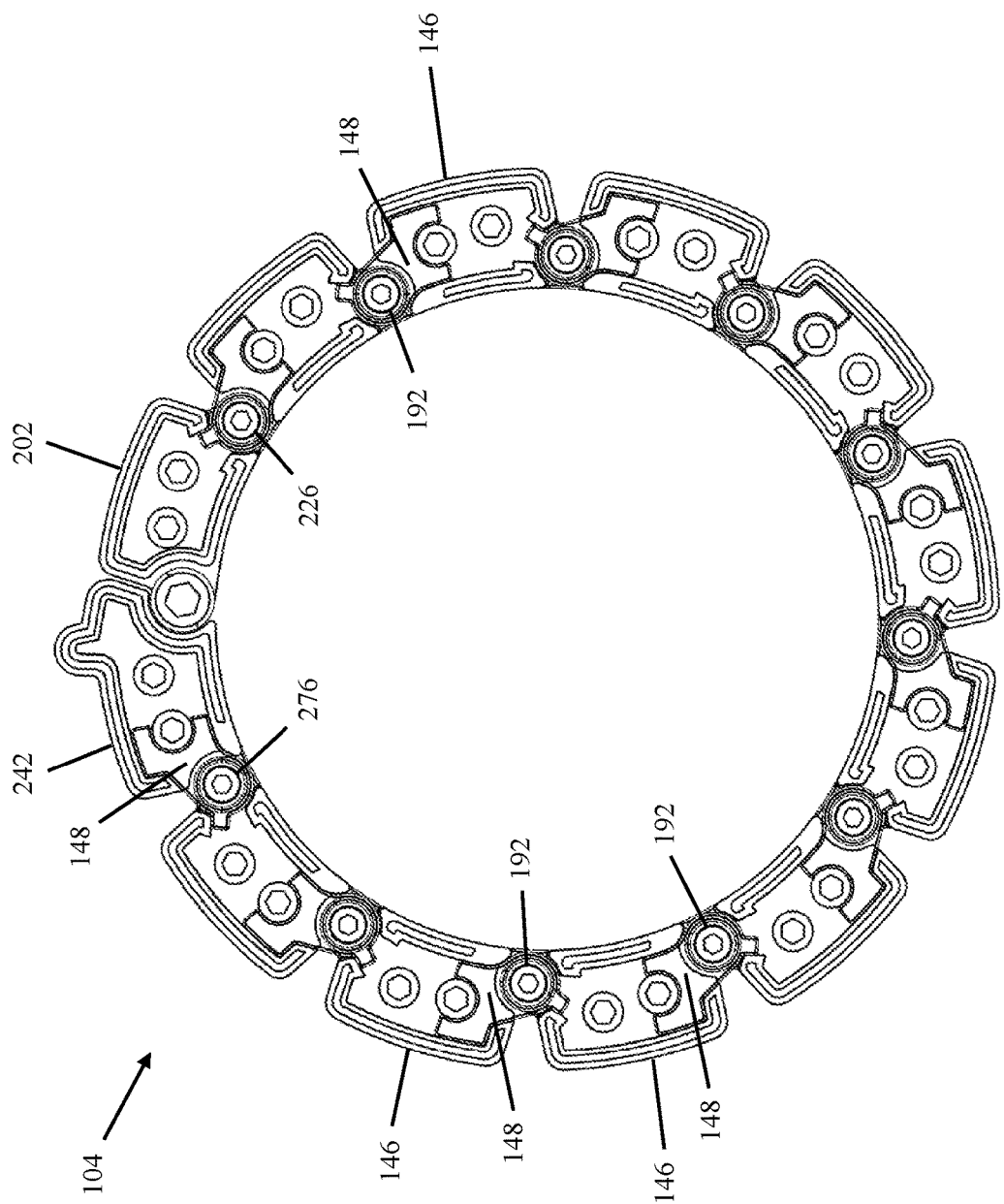
FIG. 7 is a front view of the minute number line chain of FIG. 6 without the first tiles of the intermediate minute links and the end minute links.
Figure 8:
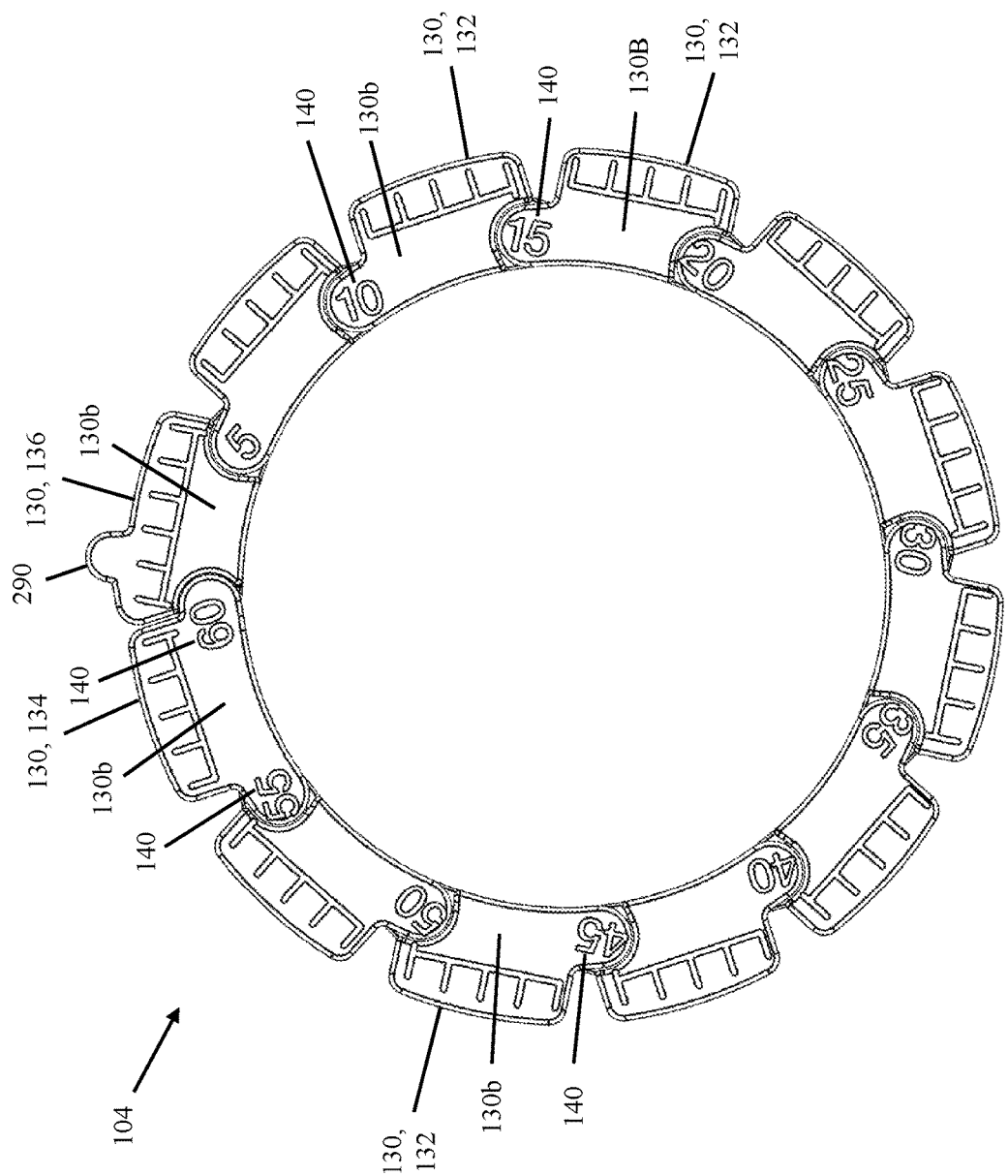
FIG. 8 is a rear view of the minute number line chain of FIG. 6.
Figure 9:
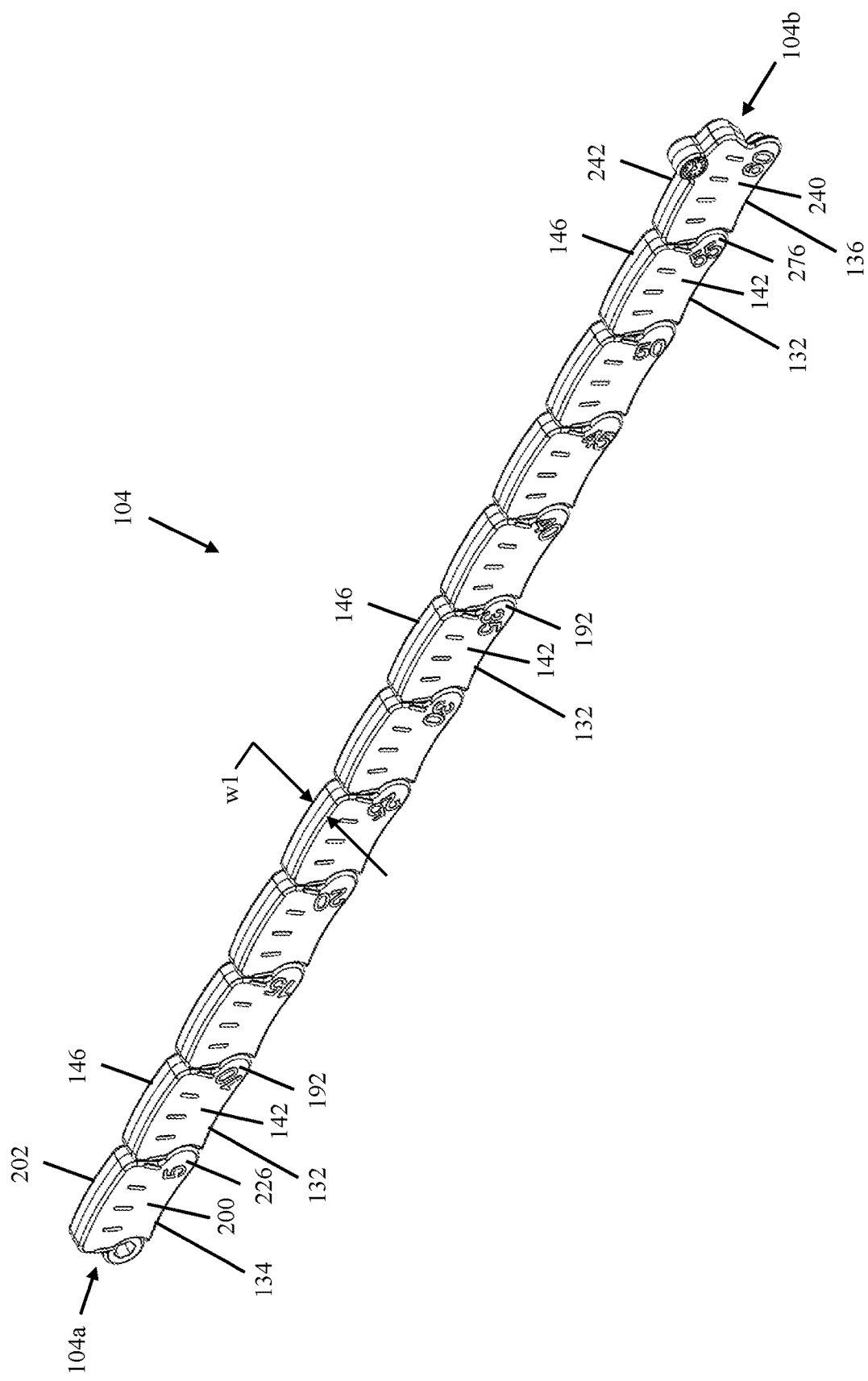
FIG. 9 is a perspective view of the minute number line chain of the educational clock of FIG. 1 arranged in its linear shape.
Figure 10:
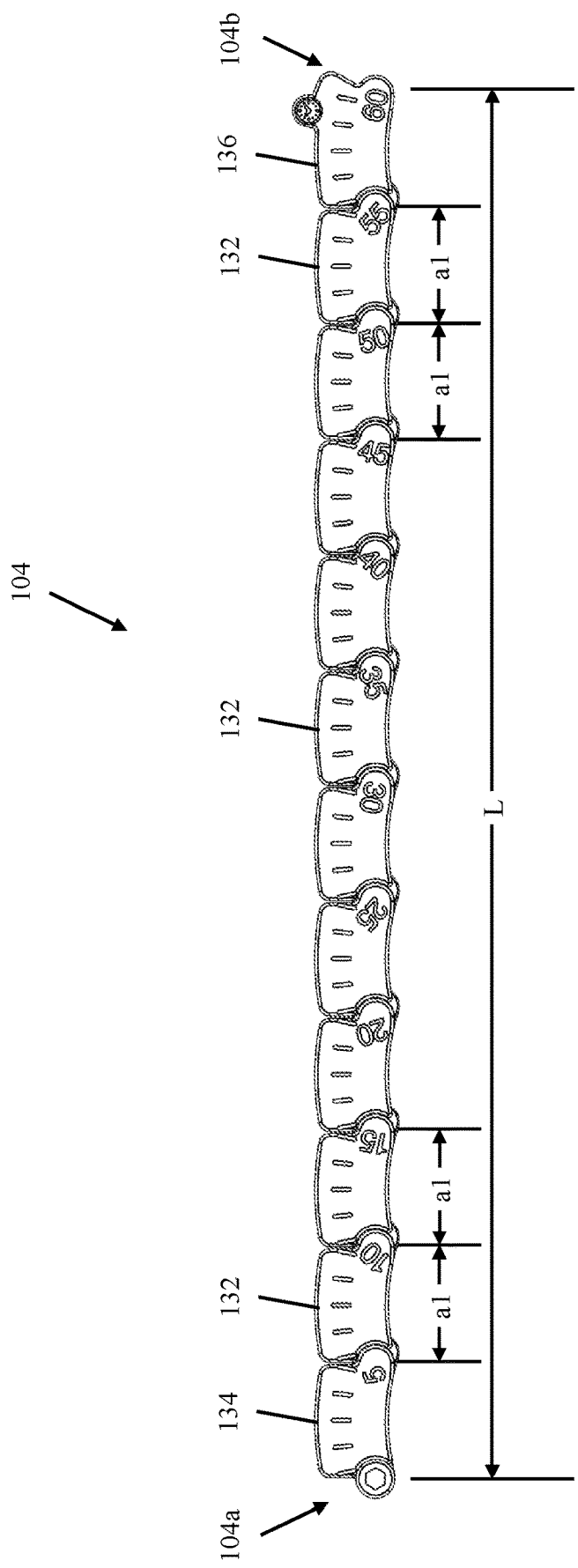
FIG. 10 is a front view of the minute number line chain of FIG. 9.

The inner recessed portion 114 defines a second annular region or seat of uniform depth for receiving at least a portion of the hour number line chain 106 arranged in its annular shape. The inner recessed portion 114 is formed radially inward from and substantially concentric to the outer recessed portion 112. The inner recessed portion 114 may be adjacent or spaced apart from the outer recessed portion 112. For example, as shown in FIGS. 3-4, the inner recessed portion 114 may be formed adjacent the outer recessed portion 112, including an annular step that forms the transition between the two recessed portions. The outer circumferential edge portion 114a of the inner recessed portion 114 may be generally shaped and sized to match the outer peripheral shape and the outer diameter of the annular-shaped hour number line chain 106.

The depth of the inner recessed portion 114 may be different from the depth of the outer recessed portion 112. In the illustrated embodiment, for example, the depth of the inner recessed portion 114 relative to the front surface 102a of the base 102 is greater than the depth of the outer recessed portion 112. In particular, the depth of the illustrated inner recessed portion 114 relative to the front surface 102a of the base 102 may be substantially equal to the sum of the width w1 of the minute number line chain 104 and the width w2 of the hour number line chain 106 9 see FIG. 17), such that the hour number line chain 106 can be seated in the inner recessed portion 114 substantially flush with the bottom surface 112c of the outer recessed portion 112.

In some embodiments (not shown), the depth of the outer recessed portion 112 and the depth of the inner recessed portion 114 may be the same such that the outer recessed portion 112 and the inner recessed portion 114 together define an annular region or seat of uniform depth for receiving both the minute number line chain 104 and the hour number line chain 106 arranged in their annular shapes. For example, the depth of the outer recessed portion 112 and the depth of the inner recessed portion 114 each may be substantially equal to the sum of the width w1 of the minute number line chain 104 and the width w2 of the hour number line chain 106. In this arrangement, the hour number line chain 106 may be shaped and sized such that the hour number line chain 106 extends substantially across the width of the annular region formed by the outer recessed portion 112 and the inner recessed portion 114 when it is seated on thereon. As a result, the minute number line chain 104 may be mounted above the hour number line chain 106 concentric with the hour number line chain 106 and substantially flush with the front surface 102a of the base 102. Further, the outer circumferential edge portion 112a of the outer recessed portion 112 may include sections that are generally shaped and sized to match the outer peripheral shape and the outer diameter of each of the annular-shaped minute number line chain 104 and the hour number line chain 106.

With particular reference to FIGS. 1-3, the base 102 may include an end support section 116 configured to support the clock 100 in a generally vertical or upright position on a work surface, such a floor or a table (not shown). A swing-out stand 118 may be pivotably mounted on the rear face of the base 102 to support the clock 100 in a non-vertical position on the work surface. In the illustrated embodiment, for example, the swing-out stand 118 is a flat panel that is connected at one end thereof to the base 102 by a hinge 120. The swing-out stand 118 can be pivotably adjusted about the hinge 120 to extend away from the base 102 and help support the clock 100 in a non-vertical, rearwardly leaning position.

The Minute and Hour Hands

Referring to FIGS. 1-2 and 4-5, the minute hand 108 and the hour hand 110 may be coupled to the base 102 via a central hub 122 so as to point to indicia on the minute number line chain 104 and indicia on the hour number line chain 106, respectively. In the illustrated embodiment, the central hub 122 is formed integrally with the base 102 as a single piece. In particular, the illustrated central hub 122 is defined by a central, non-recessed, substantially circular-shaped portion of the base 102 that is formed radially inward from and substantially concentric to the inner recessed portion 114 of the base 102. The central hub 122 portion may be generally shaped and sized to match the inner peripheral shape and inner diameter of the hour number line chain 106 arranged in its annular shape. In some embodiments, the central hub 122 portion may have another shape (e.g., oval, hexagonal, etc.) and/or configuration (e.g., the central shape may overlap or extend partially above the inner recessed portion 114). In some embodiments, the central hub 122 portion and the base 102 may be formed as separate components, which are fixedly attached to each other via mechanical fasteners, adhesives, or any other suitable means.

The minute hand 108 and the hour hand 110 may be pivotably and removably coupled on the central hub 122. In the illustrated embodiment, the central hub 122 portion of the base 102 includes a mounting post 124 formed centrally thereon. The minute hand 108 and the hour hand 110 are configured to pivotably fit over the mounting post 124 such that each is manually rotatable about a common axis through a 360 degree arc for pointing, respectively, to various indicia on the minute number line chain 104 and various indicia on the hour number line chain 106. The mounting post 124 includes a set of resilient flanges 124a to selectively engage and release the minute hand 108 and the hour hand 110. In particular, the resilient flanges 124a can flex so as to allow the minute hand 108 and the hour hand 110 to slide over the mounting post 124. Once the minute hand 108 and the hour hand 110 are slid completely over the mounting post 124, the resilient flanges 124a are released so as to axially retain the minute hand 108 and the hour hand 110 on the mounting post 124. Thereafter, the resilient flanges 124a can be manually flexed to allow the minute hand 108 and the hour hand 110 to be slidably removed from the mounting post 124. In other embodiments, the mounting post 124 may have a cylindrical shape that defines an axial bore. A removable plug (not shown) may inserted into the axial bore of the mounting post 124. The plug may have resilient feet configured to resiliently engage against the internal surface of the axial bore of the mounting post 124 so as to hold the plug in position. The plug may also have an enlarged head that projects outwardly from the axial bore of the mounting post 124 to limit axial displacement of the minute hand 108 and the hour hand 110 on the mounting post 124.

In some embodiments, the minute hand 108 and the hour hand 110 may be coupled to each other via a gear set (not shown) such that their angular movements are synchronized. For example, the gear set may incrementally drive the hour hand ahead one step corresponding to one twelfth of an hour when the minute hand is rotated forward five steps corresponding to a five minute interval.

The Minute Number Line Chain

With reference to FIGS. 1-2 and 6-13, the minute number line chain 104 includes a plurality of minute links 130 pivotably connected together via pivot joints (described below) so as to form an articulated link chain having two free ends 104a and 104b. More specifically, the minute number line chain 104 comprise a pair of end minute links 134, 136 forming the free ends 104a and 104b of the minute number line chain 104 and a plurality of intermediate minute links 132 coupled therebetween. For example, the minute number line chain 104 may include ten intermediate minute links 132 and two end minute links 134, 136, each minute link corresponding to a five-minute interval of time within a span of 60 minutes. In the illustrated embodiment, for example, the ten intermediate minute links 132 correspond, respectively, to the five-minute intervals ending at 10, 15, 20, 25, 30, 35, 40, 45, 50, and 55 minutes past the hour and the two end minute links 134, 136 correspond, respectively, to the five-minute intervals ending at 5 and 60 minutes past the hour.

As described below, the intermediate minute links 132 are pivotably connected together (via pivot joints 192 located proximate their lower or radially inward ends) and to the end minute links 134, 136 (via pivot joints 226, 276 located proximate their lower or radially inward ends) to allow the minute number line chain 104 to be selectively arranged into an annular shape or a substantially linear shape. In the illustrated embodiment, adjacent intermediate minute links 132 are pivotably connected to one another and to the end minute links 134, 136 in a secure manner that prevents inadvertent removal of the intermediate minute links 132 from the minute number line chain 104 during normal use. The end minute links 134, 136 are removably coupled to one another to connect the free ends 104a and 104b of the minute number line chain 104 in a closed loop when the minute number line chain 104 is arranged in its annular shape.

The illustrated minute number line chain 104 is configured such that when the minute number line chain 104 is arranged in its annular shape on the base 102, the pivots joints 192, 226, 276 (described below) pivotably connecting the minute links 130 of the minute number line chain are spaced on a circle C concentric with the outer recessed portion 112 of the base. The radius of the circle C is less than the inner radius of the outer recessed portion 112 or the outer radius of the inner recessed portion 114. As a result, when the annular-shaped minute number line chain 104 is coupled to the base 102, a portion of the minute number line chain, including the pivot joints can extend over radially inward from the outer recessed portion 112 and can overlap with a portion of the hour number line chain 106 that includes the pivot joints pivotably connecting together the hour links of the hour number line chain 106, as described below. In addition, the pivots joints 192, 226, 276 pivotably connecting the minute links 130 may be spaced equidistant from one another by a linear distance a1 (as described below) such that the minute number line chain 104 has a length L when arranged into its substantially linear shape.

A first set of clock indicia 138 corresponding to minutes is provided on the front or clock side faces 130a of the minute links 130 of the minute number line chain 104 so as to be visible when the minute number line chain 104 is coupled to the base 102. The minute clock indicia 138 may be divided, for example, into five-minute intervals ending at 5, 10, 15, 20, 25, 30, 35, 40, 45, 50, 55 and 60 minutes past the hour, including numerical indicia corresponding to 5, 10, 15, 20, 25, 30, 35, 40, 45, 50, 55 and 60 minutes past the hour and indicia marks corresponding to each minute within the five minute intervals ranging from 1 to 60 minutes past the hour. In the illustrated embodiment, the numerical indicia corresponding to 5 minutes past the hour and the indicia marks corresponding to each minute ranging from 1 to 5 minutes are provided on the front face 130a of the first end minute link 134, the numerical indicia corresponding to 60 minutes past the hour and the indicia marks corresponding to each minute ranging from 56 to 60 minutes are provided on the front face 130a of the second end minute link 136, and each of the numerical indicia corresponding to 10, 15, 20, 25, 30, 35, 40, 45, 50 and 55 minutes past the hour is provided on the front face 130a of an intermediate minute link 132 along with the indicia marks for the respective five-minute interval. The numerical indicia of the minute clock indicia 138 may be arranged on the front faces 130a so as to be oriented in substantially the same direction as one another corresponding to minutes on an analog clock face when the minute number line chain 104 is arranged in an annular shape. In the illustrated embodiment, when the annular-shaped minute number line chain 104 is coupled to the base 102 the numerical indicia of the minute clock indicia 138 are each oriented on the front faces 130a of the minute links 130 in a substantially vertical or upright direction relative to a support surface on which the base 102 rests.

In addition, a second set of number line indicia 140 corresponding to minutes is provided on the rear or number line faces 130b of the minute links 130 opposite the front faces 130a so as to visible when the minute number line chain 104 is removed from the base 102. The minute number line indicia 140 are divided, for example, into five-minute intervals ending at 5, 10, 15, 20, 25, 30, 35, 40, 45, 50, 55 and 60 minutes past the hour, including numerical indicia corresponding to 5, 10, 15, 20, 25, 30, 35, 40, 45, 50, 55 and 60 minutes past the hour and indicia marks, for example graduated straight line segments, corresponding to each minute ranging from 0 to 60 minutes past the hour. In the illustrated embodiment, the indicia marks corresponding to each minute ranging from 0 to 5 minutes are provided on the rear face 130b of the second end minute link 136, the numerical indicia corresponding to 55 and 60 minutes past the hour and the indicia marks corresponding to each minute ranging from 56 to 60 minutes are provided on the rear face 130b of the first end minute link 134, and each of the numerical indicia corresponding to 5, 10, 15, 20, 25, 30, 35, 40, 45, and 50 minutes past the hour is provided on the rear face 130b of an intermediate minute link 132 along with the indicia marks for the succeeding five-minute interval. The numerical indicia of the minute number line indicia 140 may be arranged on the rear faces 130b so to be oriented in substantially the same direction as one another corresponding to minutes on a number line when the minute number line chain 104 is arranged in a substantially linear shape. In the illustrated embodiment, the numerical indicia of the minute number line indicia 140 are each oriented on the rear faces 130b in a direction that is perpendicular to a longitudinal axis of the minute number line chain 104 arranged in a substantially linear shape.

The first set of clock indicia 138 and the second set of number line indicia 140 may be printed on the minute links 130, for example, by pad printing or screen printing, or may be formed integrally with the minute links 130. In some embodiments, the first set of clock indicia 138 and the second set of number line indicia 140 each may be color coded to show groups of five on the minute number line chain 104, thereby making it easier for children to visually recognize groups of five minutes. For example, each set of minute lock indicia 138, 140, may be formed using alternating colors or shades of color for different groups of indicia corresponding to five-minute intervals.

The Intermediate Links of the Minute Number Line Chain

Referring to FIGS. 9-14, each intermediate minute link 132 may include a pair of oppositely facing first and second intermediate minute link tiles 142, 146 that are fixedly attached to one another. In addition, each intermediate minute link 132 may be provided with a pivot connector 148 that is secured between the first and second intermediate minute link tiles 142, 146.

In the illustrated embodiment, each first intermediate minute link tile 142 has a body 150 and a shoulder portion 154 that extends laterally therefrom. Likewise, each second intermediate minute link tile 146 has a body 152 and a shoulder portion 156 that extends laterally therefrom.

Figure 11:
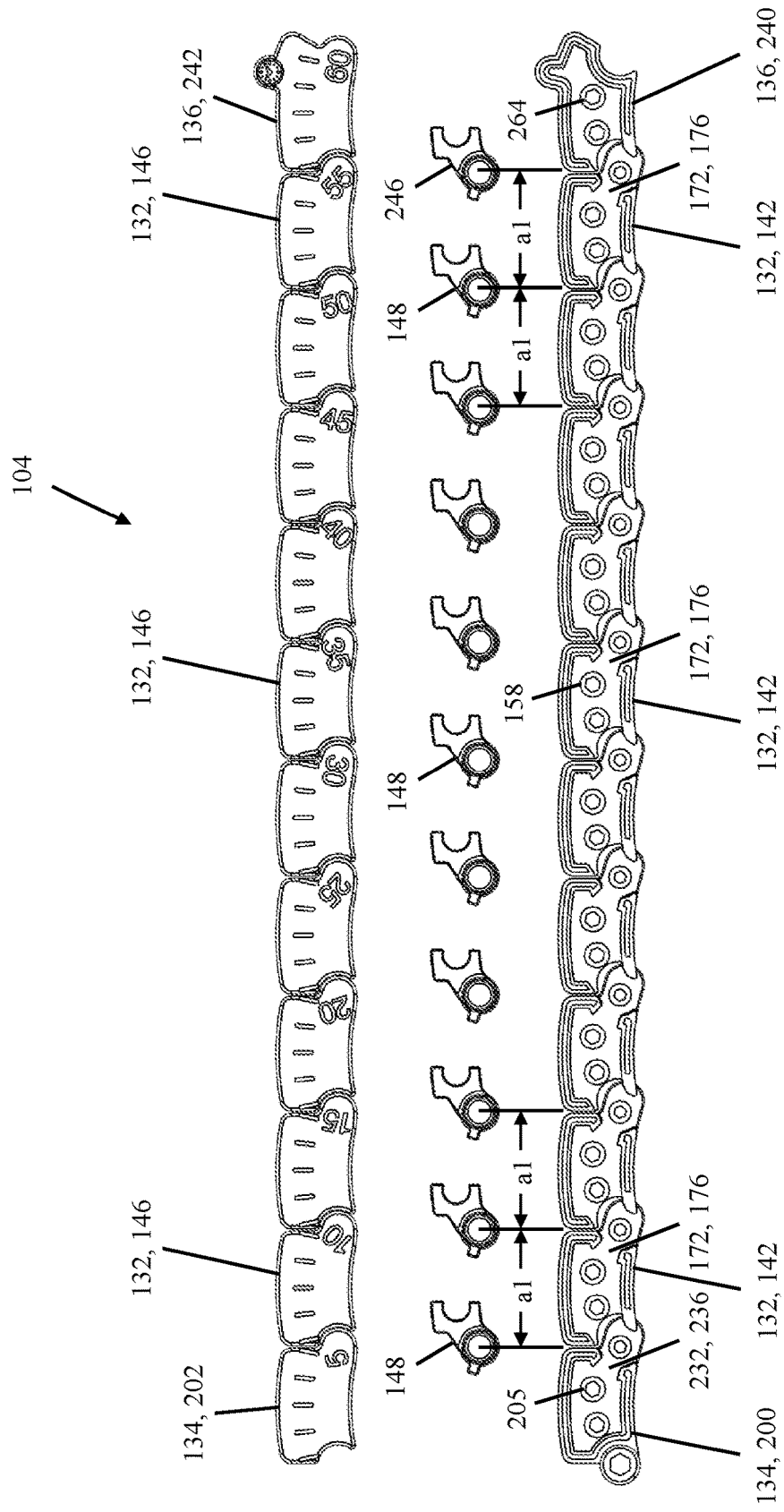
FIG. 11 is a view of the minute number line chain of FIG. 10 in an unassembled state.
Figure 12:
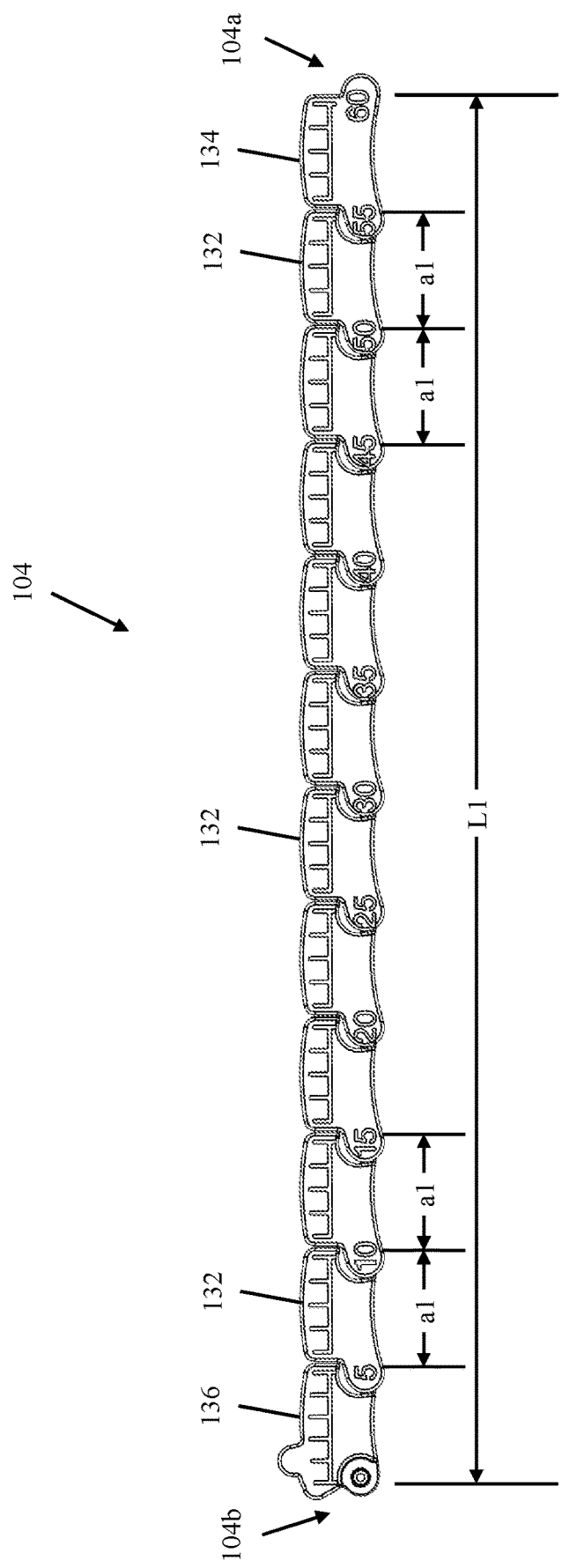
FIG. 12 is a rear view of the minute number line chain of FIG. 9.
Figure 13:
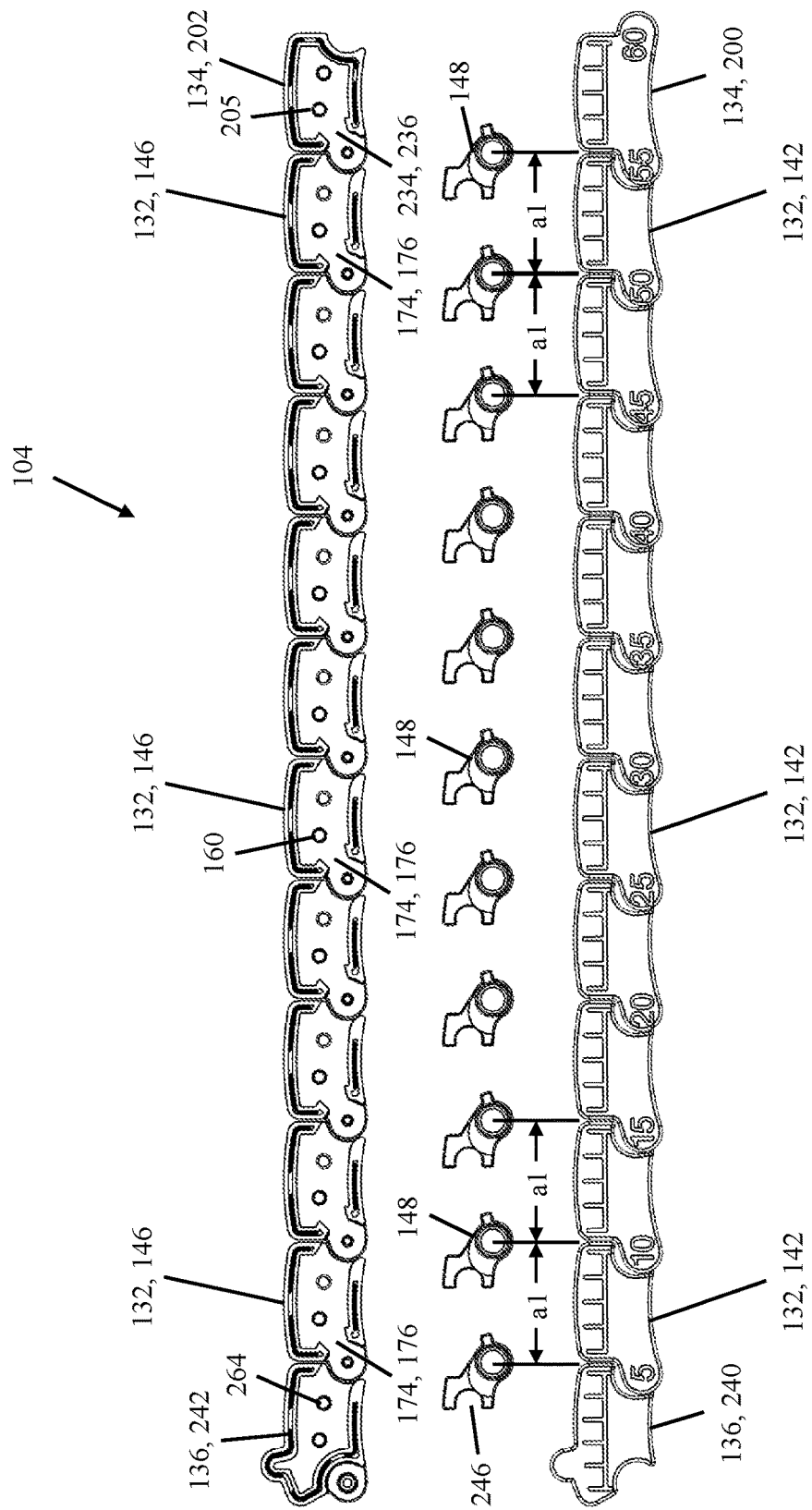
FIG. 13 is a view of the minute number line chain of FIG. 12 in an unassembled state.
Figure 14:
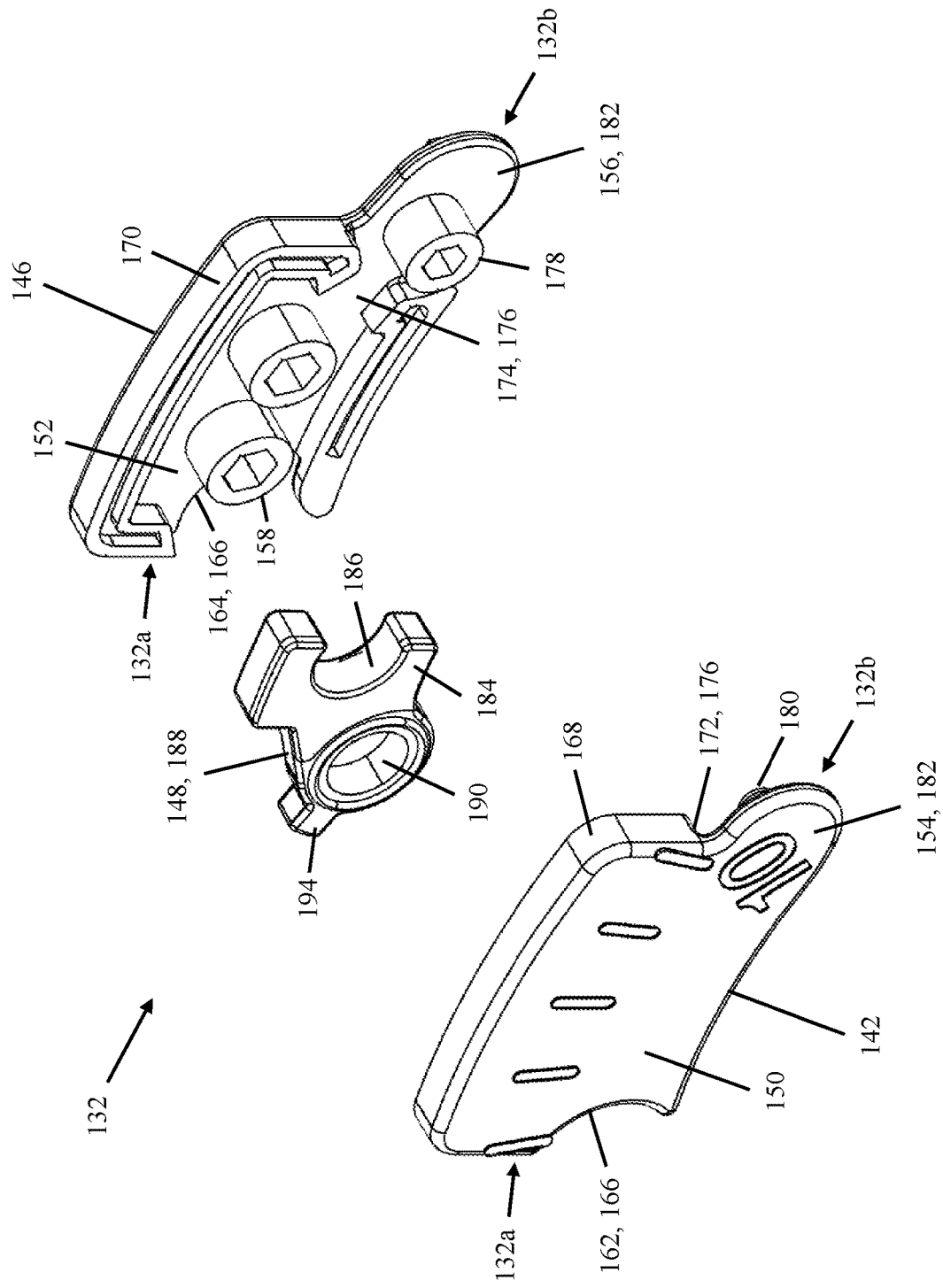
FIG. 14 is an exploded perspective view of an intermediate minute link of the minute number line chain of the educational clock of FIG. 1.

The body 150 of a first intermediate minute link tile 142 mates with the body 152 of a second intermediate minute link tile 146 via a set of mating features so as to locate the first and second tiles with respect to each other and to secure them together. For example, as shown in FIGS. 11, 13 and 14, one or more tubular connecting bosses 158 may be arranged on an interior surface of the body 150, 152 of at least one of the first intermediate minute link tile 142 and/or the second intermediate minute link tile 146. The connecting bosses 158 project substantially perpendicular from the interior surface and are aligned with connecting pins 160 arranged on an interior surface of the body 150, 152 of the other intermediate minute link tile 142, 146. The connecting pins 160 project substantially perpendicular from the interior surface of the other intermediate minute link tile and are received in the connecting bosses 158 via a press fit, a snap-fit, or any other assembly method suitable for securing a pair of first and second intermediate minute link tiles 142, 146 together.

The body 150, 152 of each first and second intermediate minute link tile 142, 146 defines an indented cutout portion 162, 164 along its periphery. When a pair of first and second intermediate minute link tiles 142, 146 are attached to one another to form an intermediate minute link 132, the indented cutout portions 162, 164 cooperate to form a receiving area 166 at a lower end of a first lateral side 132a of the intermediate minute link 132. The receiving area 166 rotatably receives therein a connecting portion 182 formed by the mated shoulder portions 154, 156 of the first and second intermediate minute link tiles 142, 146 of an adjacent intermediate minute link 132 (as described below).

As shown in FIG. 14, peripheral sidewalls 168, 170 extend substantially perpendicularly from the bodies 150, 152 of the first and second intermediate minute link tiles 142, 146. Each peripheral sidewall 168, 170 include a slotted opening 172, 174 that extends therethrough adjacent the shoulder portion 154, 156 of the intermediate minute link tile. The slotted openings of the first and second tiles of each intermediate minute link 132 are aligned with each other and together form a pivot stop aperture 176 of the intermediate minute link 132 proximate the connecting portion 182 when a pair of first and second intermediate minute link tiles are disposed in a mated relationship with one another. The pivot stop aperture 176 is shaped and sized so that the arm member (described below) of the pivot connector 148 of an adjacent intermediate minute link 132 can engage therein for limiting the range of rotation of respective adjacent intermediate minute links 132 relative to each other. In the illustrated embodiment, as described below, the pivot stop aperture limits 176 the range of rotation of adjacent intermediate minute links 132 relative to one another to about 30 degrees such that the pivot angle between adjacent intermediate minute links 132 can be from about 180 degrees to about 150 degrees.

The shoulder portion 154 of a first intermediate minute link tile 142 is also configured to mate with the shoulder portion 156 of a second intermediate minute link tile 146. In particular, a tubular hinge boss 178 is arranged on an interior surface of the shoulder portion 154, 156 of the first or second intermediate minute link tile 142, 146. The hinge boss 178 projects substantially perpendicular from the interior surface and is aligned with a hinge pin 180 that is arranged on the interior surface of the shoulder portion 154, 156 of the other intermediate minute link tile. The hinge pin 180 projects substantially perpendicular from the interior surface of the other intermediate minute link tile and are received in the hinge boss 178 via a press fit, a snap-fit, or any other assembly method suitable for securing a pair of first and second intermediate minute link tiles 142, 146 together.

The mated shoulder portions 154, 156 cooperate to form a connecting portion 182 at a lower end of a second lateral side 132b of the intermediate minute link 132 that is opposite the first lateral side 132a. The shoulder portions 154, 156 have an arcuate peripheral shape that is complementary to an arcuate peripheral shape of the indented cutout portions 162, 164 of the intermediate minute link tile 142, 146. As a result, the connecting portion 182 of an intermediate minute link 132 can be rotatably received in the receiving area 166 of an adjacent intermediate minute link 132.

The pivot connector 148 of each intermediate minute link 132 is configured to pivotably connect the link to an adjacent intermediate minute link 132 (or an adjacent end minute link 134, 136, as described further below). In the illustrated embodiment, for example, the pivot connector 148 may have a retaining section 184 shaped and sized to fit securely within and against the sidewalls 168, 170 of the intermediate minute link 132. In addition, one or more pin holes 186 may be formed in the retaining section 184, each pin hole 186 being shaped, sized and spaced to at least partially receive and retain a connecting boss 158 and/or a connecting pin 160 of the intermediate minute link 132. When a pair of first and second intermediate minute link tiles 142, 146 of the intermediate minute link 132 are attached together, the connecting boss 158 and the connecting pin 160 engage in the pin hole 186 to help retain the pivot connector 148 in position between the intermediate minute link tiles.

The pivot connector 148 also includes an arm member 188 connected to the retaining section 184. The arm member 188 extends outwardly past the periphery of the first and second intermediate minute link tiles 142, 146 and into the receiving area 166 formed at the lower end of the first lateral side 132a of the intermediate minute link 132 when the pivot connector 148 is secured between the intermediate minute link tiles as described above. As a result, the arm member 188 can be received between the mated shoulder portions 154, 156 of the first and second intermediate minute link tiles 142, 146 of an adjacent intermediate minute link 132.

The arm member 188 is pivotably coupled to the connecting portion 182 of an adjacent intermediate minute link 132 via a pivot hole 190 formed through the arm member 188. The pivot hole 190 is spaced in axial alignment with the hinge boss 178 and the hinge pin 180 of the adjacent intermediate minute link 132 and is shaped and sized to rotatably receive the hinge boss 178 and the hinge pin 180 therein. Together, the arm member 188 of the intermediate minute link 132 and the connecting portion 182 of an adjacent intermediate minute link 132 form a pivot joint 192 for pivotably connecting the intermediate minute links 132 to each other. The pivot joints 192 formed by adjacent pairs of adjacent intermediate links 132 are located proximate the lower or radially inward ends of the intermediate links 132 and are spaced from one another by a linear distance a1.

In addition, a stop tab 194 is formed near a distal end of the arm member 188 of each pivot connector 148 and protrudes radially away from the pivot hole 190 of the arm member 188. The stop tab 194 is configured to extend into the pivot stop aperture 176 of an adjacent intermediate minute link 132 when the arm member 188 is pivotably coupled to the connecting portion 182 of the adjacent intermediate minute link. As the pivot connector 148, including the arm member 188, pivots about the hinge boss 178 of the adjacent intermediate minute link, the stop tab 194 rotates within the pivot stop aperture 176 of the adjacent intermediate minute link 132 toward engagement with one of the peripheral sidewalls 168, 170 so as to limit rotation of the intermediate minute link 132 relative to the adjacent intermediate minute link 132. As a result, when the minute number line chain 104 is assembled with adjacent intermediate minute links 132 pivotably connected together, the stop tab 194 of one intermediate link and the pivot stop aperture 176 of an adjacent intermediate minute links 132 cooperate to limit the range of rotation of the pivot joint 192 formed between the pair of intermediate links. In the illustrated embodiment, the range of rotation of the pivot joint 192 between adjacent intermediate minute links 132 is about 30 degrees such that the pivot angle between them can range from about 180 degrees to about 150 degrees.

The End Links of the Minute Number Line Chain

Referring to FIGS. 9-13 and 15-16, the end minute links 134, 136 of the minute number line chain 104 may include one or more of the features described above for the intermediate minute links, however the end minute links 134, 136 are configured to be removably coupled to each other.

Figure 15:
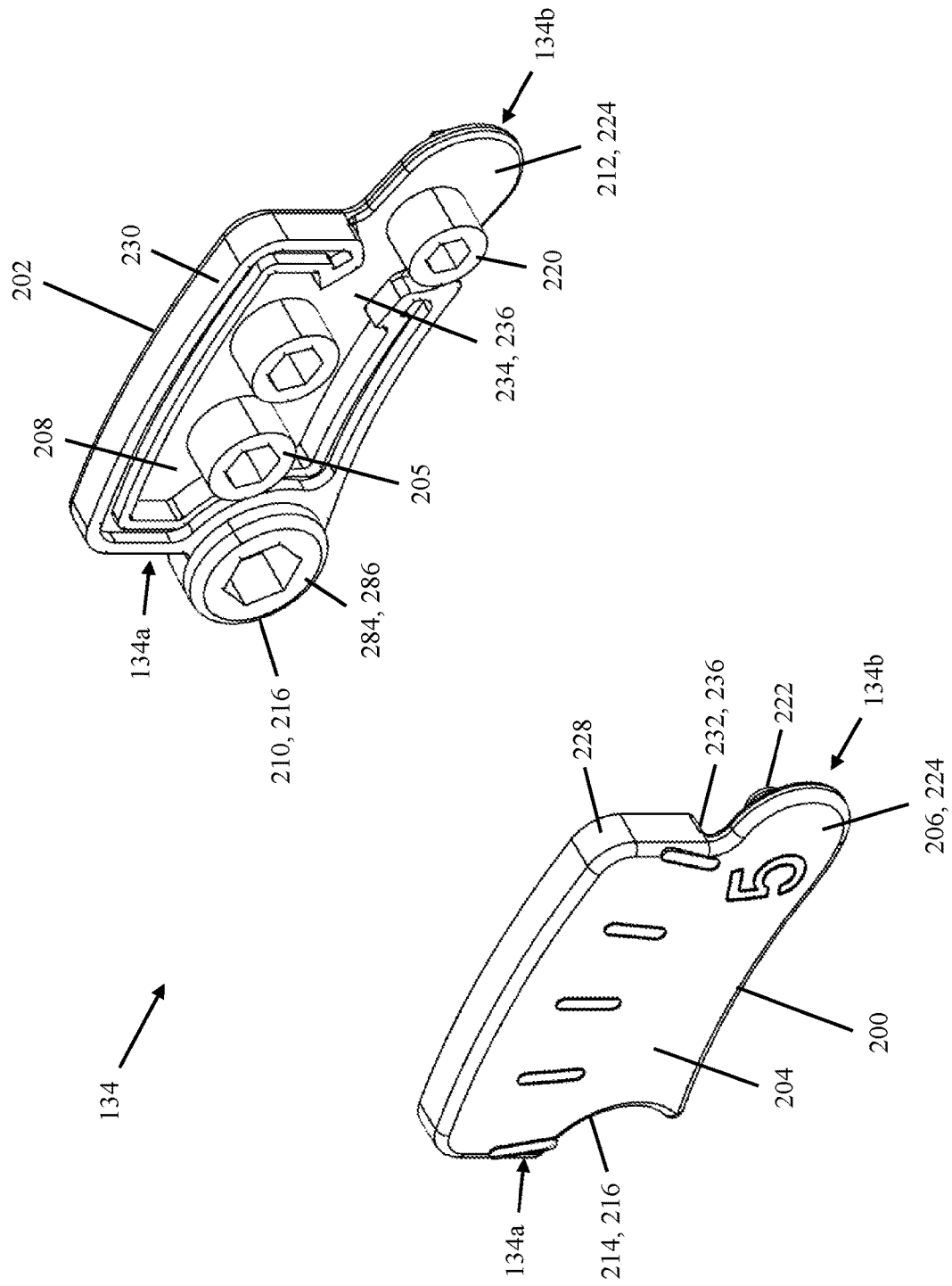
FIG. 15 is an exploded perspective view of a first end minute link of the minute number line chain of the educational clock of FIG. 1.

In the illustrated embodiment, the first end minute link 134 corresponding to 5 minutes past the hour includes a pair of oppositely facing first and second end minute link tiles 200, 202 that are fixedly attached to one another, as shown in FIG. 15. The first end minute link tile 200 has a body 204 and a shoulder portion 206 that extends laterally therefrom. The second end minute link tile 202 has a body 208 and two shoulder portions 210, 212 that extend laterally from the body on opposite sides thereof.

The body 204 of the first end minute link tile 200 is configured to mate with the body 208 of the second end minute link tile 202. In particular, the body 204 and the body 208 may be provided with mating features 205, such as connecting bosses and pins or snaps, to locate the first end minute link tile 200 and the second end minute link tile 202 with respect to each other and to secure them together.

The body 204 of the first end minute link tile 200 defines an indented cutout portion 214 along its periphery opposite the shoulder portion 206. When the first end minute link tile 200 and the second end minute link tile 202 are attached to one another to form the first end minute link 134, the indented cutout portion 214 of the first end minute link tile 200 and the first shoulder portion 210 of the second end minute link tile 202 cooperate to form a receiving area 216 at a lower end of a first lateral side 134a of the first end minute link 134. The receiving area 216 removably receives a connecting portion 218 of the second end minute link 136 (as described below).

The shoulder portion 206 of the first end minute link tile 200 and the second shoulder portion 212 of the second end minute link tile 202 are also configured to mate with each other. In the illustrated embodiment, for example, a tubular hinge boss 220 may be arranged on an interior surface of either the shoulder portion 206 of the first end minute link tile 200 or the second shoulder portion 212 of the second end minute link tile 202. The hinge boss 220 projects substantially perpendicular from the interior surface and is aligned with a hinge pin 222 arranged on the interior surface of the other shoulder portion 206, 212. The hinge pin 222 projects substantially perpendicular from the interior surface of the other shoulder portion and is received in the hinge boss 220 via a press fit, a snap-fit, or any other assembly method suitable for securing the first end minute link tile 200 and the second end minute link tile 202 together.

The shoulder portion 206 of the first end minute link tile 200 and the second shoulder portion 212 of the second end minute link tile 202 cooperate to form a connecting portion 224 at at a lower end of a second lateral side 134b of the first end minute link 134 that is opposite the first lateral side 134a. The shoulder portions 206, 212 have an arcuate peripheral shape that is complementary to an arcuate peripheral shape of the indented cutout portions 162, 164 of the intermediate minute links 132. As a result, the connecting portion 224 of the first end minute link 134 can be rotatably received in the receiving area 166 of an adjacent intermediate minute link 132.

In order to pivotably connect the end minute link 134 to an adjacent intermediate minute link 132, the arm member 188 of the pivot connector 148 of the adjacent intermediate link 132 is pivotably coupled to the connecting portion 224 of the first end minute link 134. In particular, the arm member 188 is received between the mated shoulder portions 206, 212 of the first end minute link 134. The hinge boss 220 of the first end minute link 134 is inserted through the pivot hole 190 formed through the arm member 188 of the adjacent intermediate link 132 so as to be rotatably received therein. Together, the arm member 188 of the intermediate minute link 132 and the connecting portion 224 of the first end minute link 134 form a pivot joint 226 for pivotably connecting the adjacent intermediate minute link 132 and the first end minute link 134 to each other. In the illustrated embodiment, the pivot joint 226 formed between the first end minute link 134 and the adjacent intermediate minute link 132 is located proximate the lower or radially inward ends of the first end minute link 134 and the adjacent intermediate minute link 132 and is spaced from the other pivot joint 192 formed in part by the adjacent intermediate link 132 by the same linear distance a1 as between adjacent pivot joints 192.

Peripheral sidewalls 228, 230 extend substantially perpendicularly from the body 204 of the first end minute link tile 200 and the body 208 of the second end minute link tile 202 of the first end minute link 134. Each peripheral sidewall 228, 230 include a slotted opening 232, 234 that extends therethrough. The slotted openings 232, 234 are aligned with each other and together form a pivot stop aperture 236 of the first end minute link 134 proximate the connecting portion 224 when the first end minute link tile 200 and the second end minute link tile 202 are disposed in a mated relationship with one another. The pivot stop aperture 236 is shaped and sized so that the arm member 188 of an adjacent intermediate link 132 can engage therein for limiting the range of rotation of the first end minute link 134 and the adjacent intermediate minute link 132 relative to each other. In the illustrated embodiment, the pivot stop aperture 236 limits the range of rotation of the first end minute link 134 and the adjacent intermediate minute link 132 to about 30 degrees such that the pivot angle between them can be from about 180 degrees to about 150 degrees.

Figure 16:
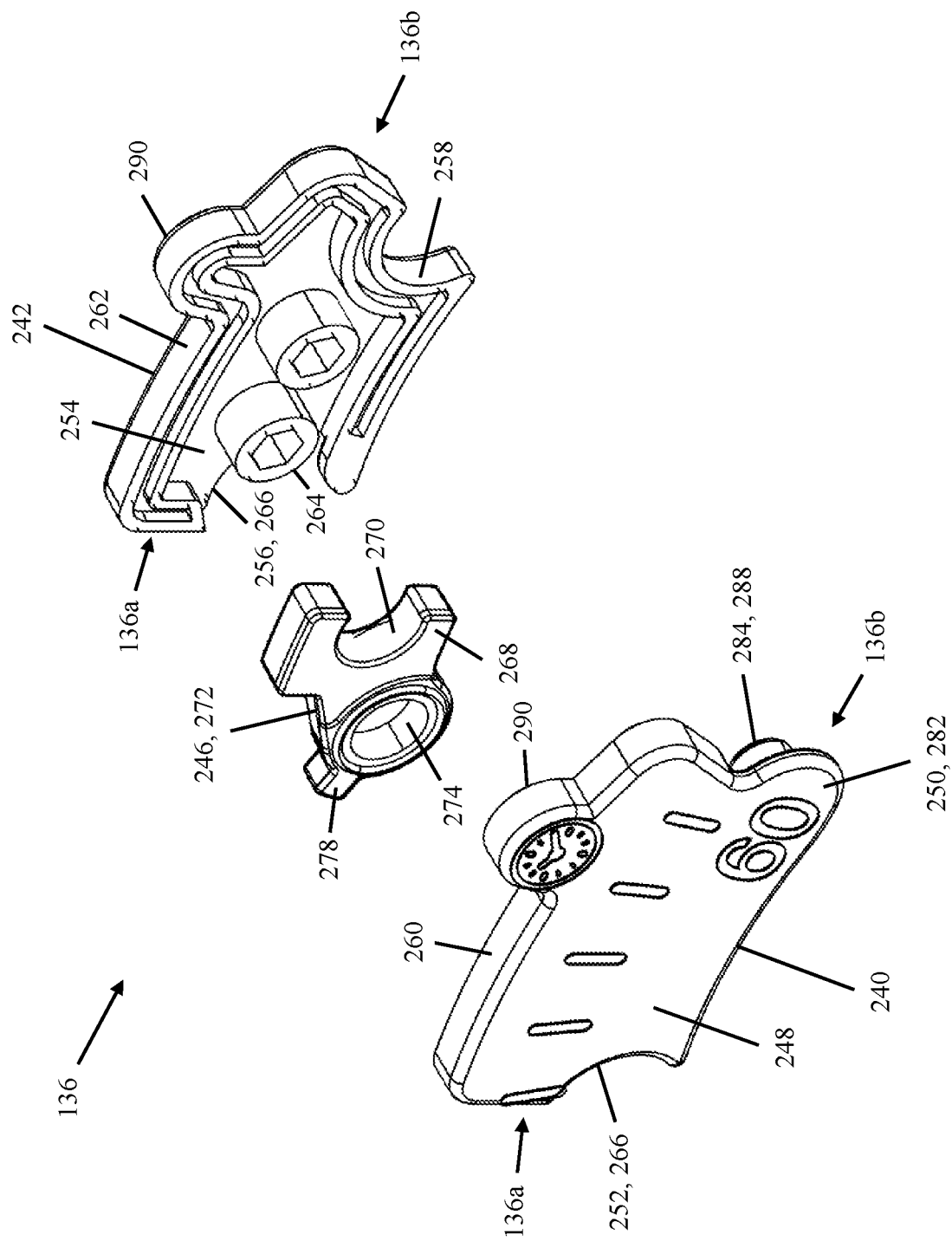
FIG. 16 is an exploded perspective view of a second end minute link of the minute number line chain of the educational clock of FIG. 1.
Figure 17:
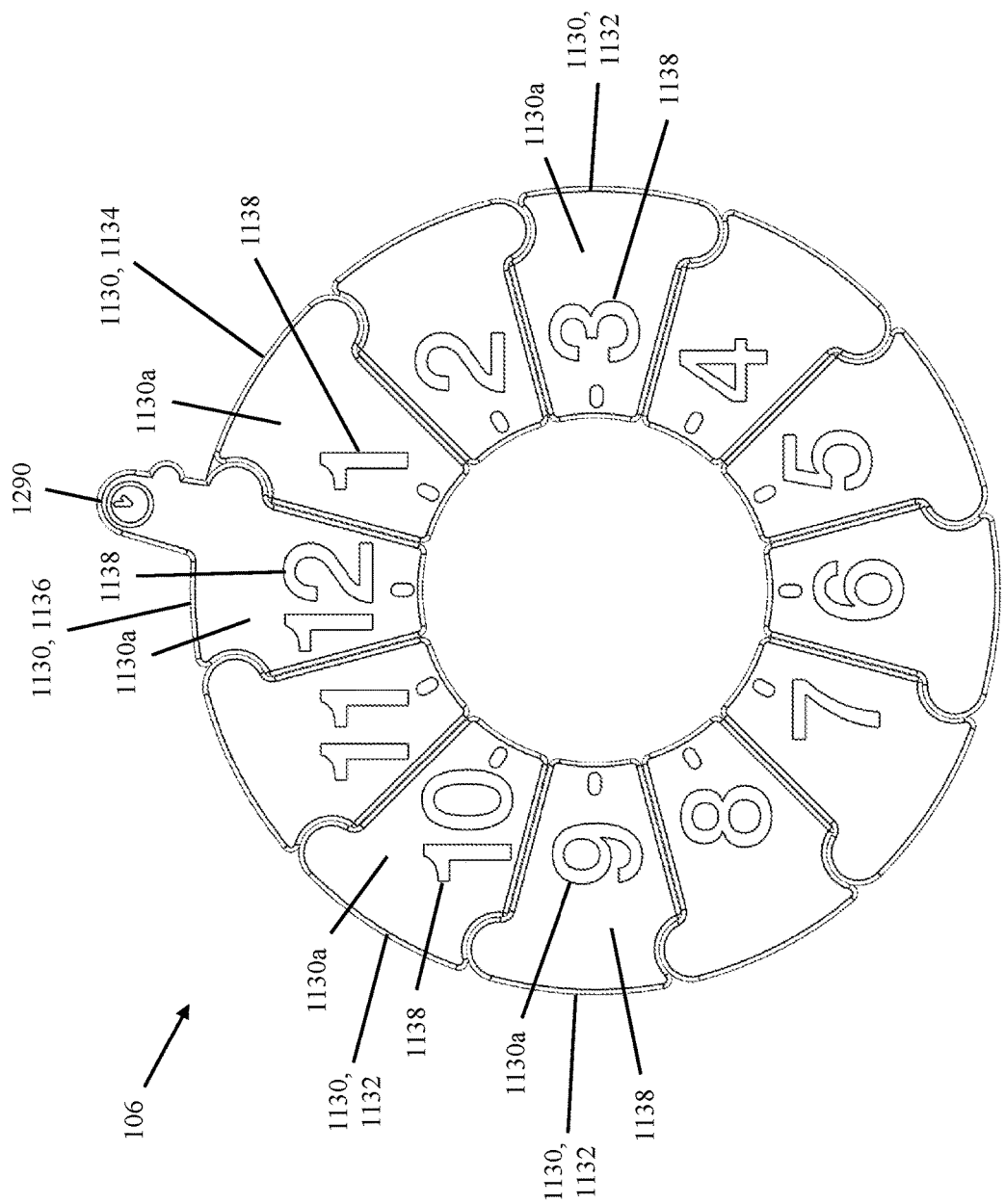
FIG. 17 is a front view of the hour number line chain of the educational clock of FIG. 1 arranged in its annular shape.
Figure 18:
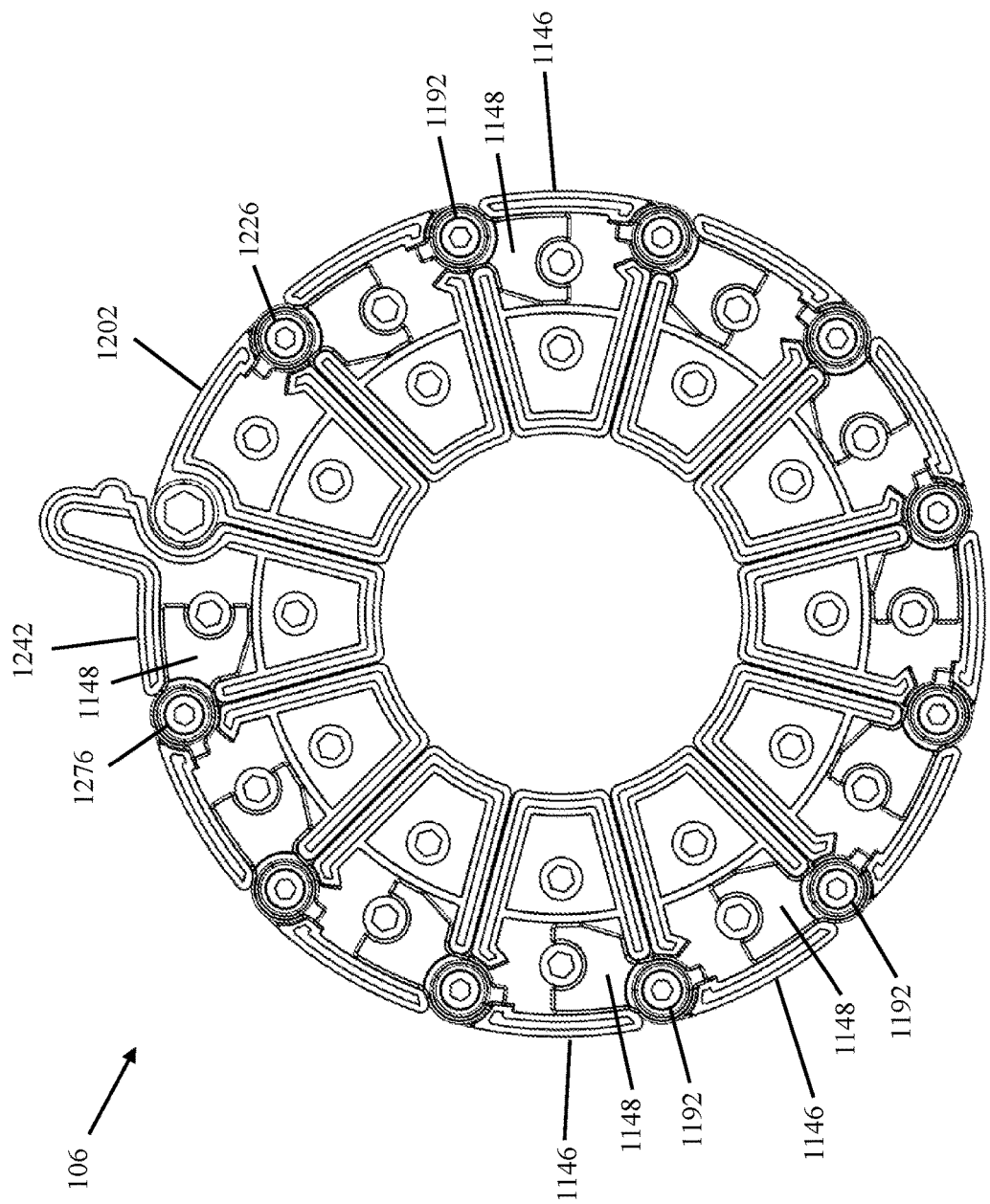
FIG. 18 is a front view of the hour number line chain of FIG. 17 without the first tiles of the intermediate hour links and the end hour links.
Figure 19:
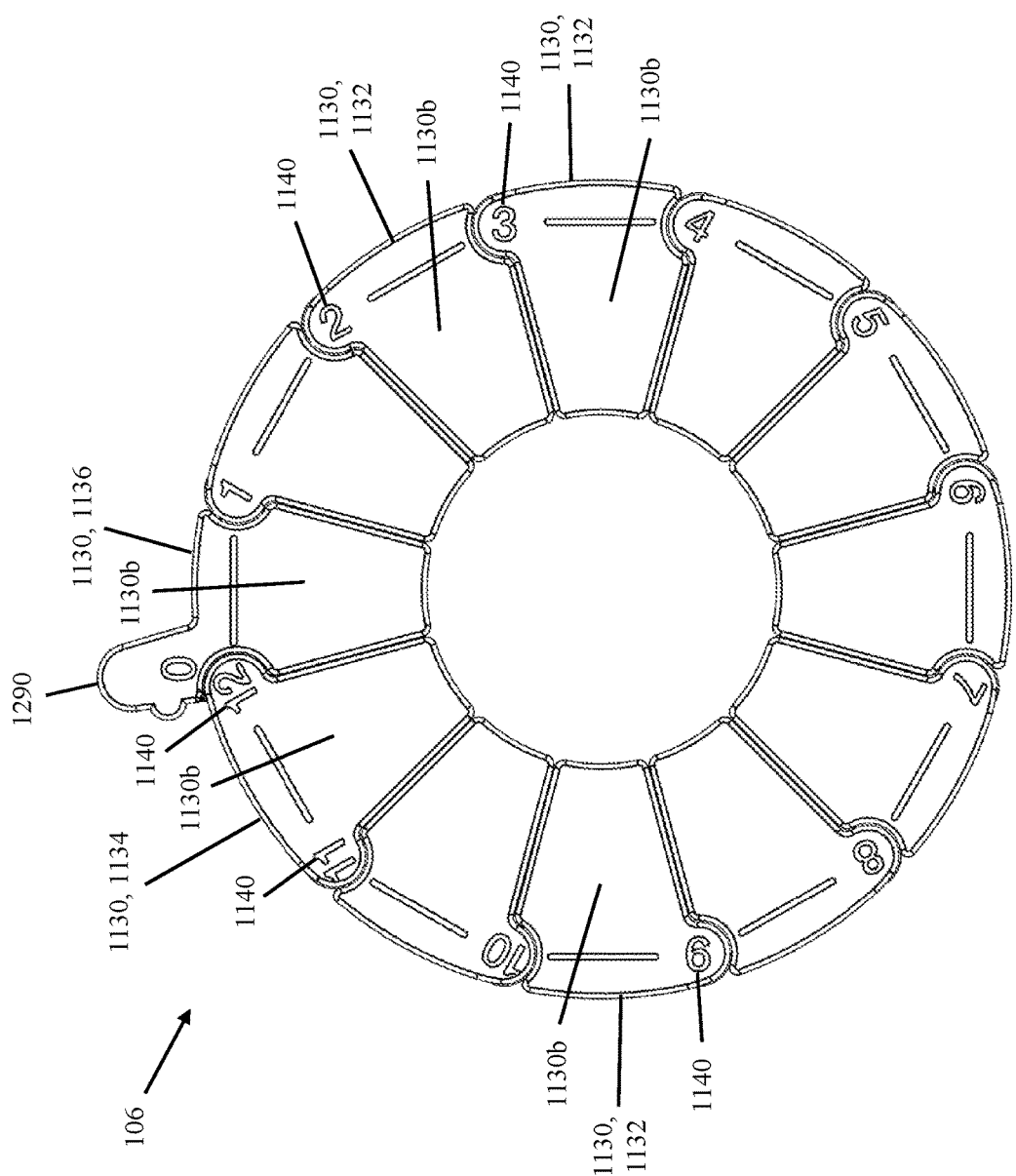
FIG. 19 is a rear view of the hour number line chain of FIG. 17.
Figure 20:
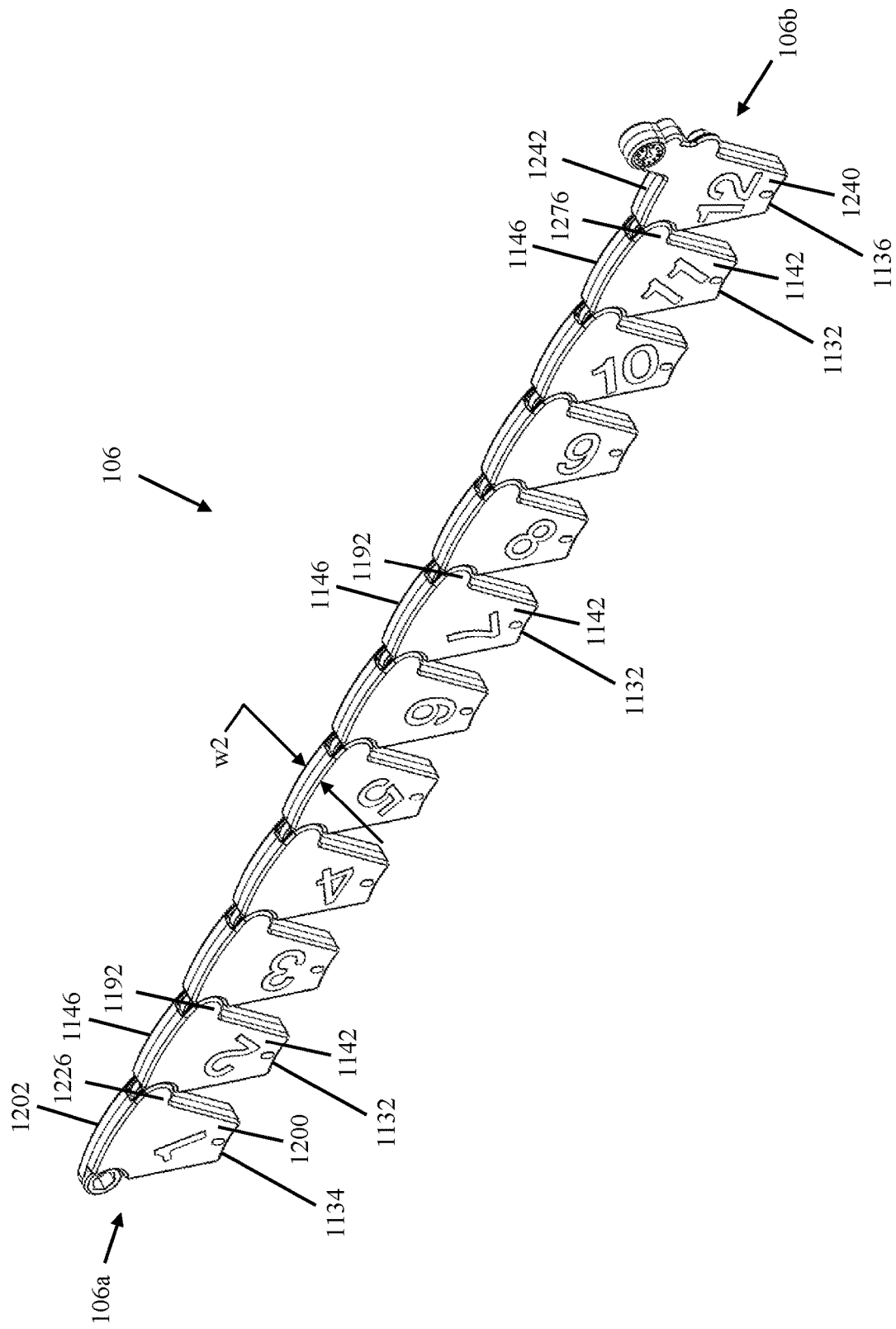
FIG. 20 is a perspective view of the hour number line chain of the educational clock of FIG. 1 arranged in its linear shape.
Figure 21:
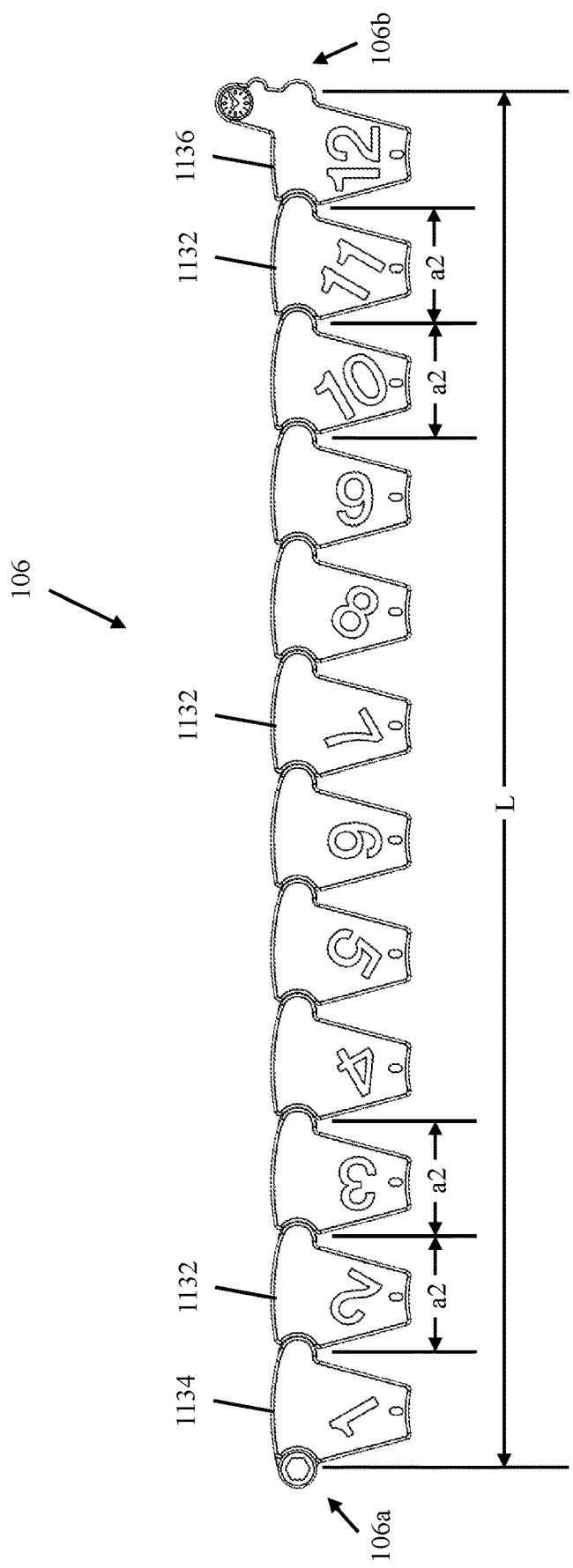
FIG. 21 is a front view of the hour number line chain of FIG. 20.

The second end minute link 136 corresponding to 60 minutes past the hour may include a pair of oppositely facing first and second end minute link tiles 240, 242 that are fixedly attached to one another and a pivot connector 246 that is secured between the end minute link tiles 240, 242, as shown in FIG. 16.

The first end minute link tile 240 has a body 248 and a shoulder portion 250 that extends laterally therefrom. The body 248 of the first end minute link tile 240 defines an indented cutout portion 252 along its periphery opposite the shoulder portion 250. The second end minute link tile 242 has a body 254 that defines two indented cutout portions 256, 258 along its periphery on opposite sides thereof. Peripheral sidewalls 260, 262 extend substantially perpendicularly from the body 248 of the first end minute link tile 240 and the body 254 of the second end minute link tile 242.

The body 248 of the first end minute link tile 240 is configured to mate with the body 254 of the second end minute link tile 242. In particular, the body 248 and the body 254 may be provided with mating features 264, such as connecting bosses and pins or snaps, to locate the first end minute link tile 240 and the second end minute link tile 242 with respect to each other and to secure them together.

When the first end minute link tile 240 and the second end minute link tile 242 are attached to one another to form the second end minute link 136, the indented cutout portion 252 of the first end minute link tile 240 and the first indented cutout portion 256 of the second end minute link tile 242 cooperate to form a receiving area 266 at a lower end of a first lateral side 136a of the second end minute link 136. The receiving area 266 rotatably receives therein a connecting portion 182 of an adjacent intermediate minute link 132.

The pivot connector 246 of the second end minute link 136 is configured to pivotably connect the link to an adjacent intermediate minute link 132. In the illustrated embodiment, for example, the pivot connector 246 may have a retaining section 268 shaped and sized to fit securely within and against the sidewalls 260, 262 of the second end minute link 136. In addition, one or more pin holes 270 may be formed in the retaining section 268, each pin hole 270 being shaped, sized and spaced to at least partially receive and retain a mating feature 264 of the second end minute link 136. When the first and second end minute link tiles 240, 242 of the second end minute link 136 are attached together, the mating feature 264 engages in the pin hole 270 to help retain the pivot connector 246 in position between the end minute link tiles.

The pivot connector 246 also includes an arm member 272 connected to the retaining section 268. The arm member 272 extends outwardly past the periphery of the first and second end minute link tiles 240, 242 and into the receiving area 266 of the second end minute link 136 when the pivot connector 246 is secured between the end minute link tiles as described above. As a result, the arm member 272 can be received between the mated shoulder portions 154, 156 of the first and second intermediate minute link tiles 142, 146 of an adjacent intermediate minute link 132.

The arm member 272 is pivotably coupled to the connecting portion 182 of an adjacent intermediate minute link 132 via a pivot hole 274 formed through the arm member 272. The pivot hole 274 is spaced in axial alignment with the hinge boss 178 and the hinge pin 180 of the adjacent intermediate minute link 132 and is shaped and sized to rotatably receive the hinge boss 178 and the hinge pin 180 therein. Together, the arm member 272 of the second end minute link 136 and the connecting portion 182 of an adjacent intermediate minute link 132 form a pivot joint 276 for pivotably connecting the second end minute link 136 and the adjacent intermediate minute link 132 to each other. In the illustrated embodiment, the pivot joint 276 formed between the second end minute link 136 and the adjacent intermediate minute link 132 is located proximate the lower or radially inward ends of the second end minute link 136 and the adjacent intermediate minute link 132 and is spaced from the other pivot joint 192 formed in part by the adjacent intermediate link 132 by the same linear distance a1 as between adjacent pivot joints 192.

In addition, a stop tab 278 is formed near a distal end of the arm member 272 of the pivot connector 246 and protrudes radially away from the pivot hole 274 of the arm member 272. The stop tab 278 is configured to extend into the pivot stop aperture 176 of an adjacent intermediate minute link 132 when the arm member 272 is pivotably coupled to the connecting portion 182 of the adjacent intermediate minute link. As the pivot connector 246, including the arm member 272, pivots about the hinge boss 178 of the adjacent intermediate minute link, the stop tab 278 rotates within the pivot stop aperture 176 of the adjacent intermediate minute link 132 toward engagement with one of the peripheral sidewalls 168, 170 so as to limit rotation of the second end minute link 136 relative to the adjacent intermediate minute link 132. As a result, when the minute number line chain 104 is assembled with the second end minute link 136 pivotably connected to an adjacent intermediate minute link 132, the stop tab 278 of the second end minute link 136 and the pivot stop aperture 176 of the adjacent intermediate minute link 132 cooperate to limit the range of rotation of the pivot joint 276 formed between the pair of intermediate links. In the illustrated embodiment, the range of rotation of the pivot joint 276 between the second end minute link 136 and an adjacent intermediate minute link 132 is about 30 degrees such that the pivot angle between them can range from about 180 degrees to about 150 degrees.

The shoulder portion 250 of the first end minute link tile 240 and the second indented cutout portion 258 of the second end minute link tile 242 form a connecting portion 282 at a lower end of the second lateral side 136b of the second end minute link 136 that is opposite the first lateral side 136a. More specifically, the shoulder portion 250 is configured to be received in the receiving area 216 of the first end minute link 134, while the second indented cutout portion 258 is configured to receive therein the first shoulder portion 210 of the first end minute link 134. In some embodiments, the shoulder portion 250 and the second indented cutout portion 258 may have arcuate peripheral shapes that are complementary to arcuate peripheral shapes of the indented cutout portion 214 and the first shoulder portion 210 of the first end minute link 134.

In addition, the shoulder portion 250 of the first end minute link tile 240 of the second end minute link 136 and the first shoulder portion 210 of the second end minute link tile 202 of the first end minute link 134 may be provided with a fastening assembly 284 configured to releasably couple the end minute links 134, 136 together when the minute number line chain 104 is arranged in its annular shape. The fastening assembly may include mechanical fasteners, including, but not limited to, snaps, tabs, hooks, clips, clamps, or Velcro, magnetic fasteners, or any other suitable fasteners for releasably coupling the end minute links 134, 136 together. In the illustrated embodiment, for example, the fastening assembly includes a tubular retaining boss 286 and a retaining pin 288 that are arranged opposite each other, respectively, on the shoulder portion 250 of the first end minute link tile 240 of the second end minute link 136 and the first shoulder portion 210 of the second end minute link tile 202 of the first end minute link 134. The retaining boss 286 and the retaining pin 288 may be shaped and sized to be friction fitted together and to be manually separable without the aid of any tools. In other embodiments, the first shoulder portion 210 of the second end minute link tile 202 of the first end minute link 134 may be C-shaped at its distal end so as to form a snap-fit connector around the retaining boss 286 arranged on the shoulder portion 250 of the first end minute link tile 240 of the second end minute link 136 or vice versa.

The Locating Key of the Minute Number Line Chain

Referring to FIGS. 4-6, 8 and 16, the minute number line chain 104 may include one or more locating features or keys 290 to locate the minute number line chain 104 in a predetermined orientation on the base 102. The base 102 may include complementary locating features or keyways 292 that cooperate with the keys 290 so that the minute number line chain 104 can be received by the outer recessed portion 112 of the base 102. In the illustrated embodiment, for example, the first and second end minute link tiles 240, 242 of the second end minute link 136 have protrusions that mate with one another to form a key 290 at an upper end of the second end minute link 136. The base 102 has a key slot 292 that is formed in the outer circumferential edge portion 112a of the outer recessed portion 112 and is shaped and sized to fittingly receive the key 290 therein. However, it would be understood by one of ordinary skill in the art that in other embodiments, for example, the key 290 and the keyway 292 may be constructed using other configurations and may be located on other minute links 130 and other areas of the base 102 while still providing the desired function of locating the minute number line chain 104 in a predetermined orientation on the base 102.

The Hour Number Line Chain

Referring to FIGS. 1-2 and 17-24, the hour number line chain 106 includes a plurality of hour links 1130 pivotally connected together via pivot joints (described below) so as to form an articulated link chain having two free ends 106a and 106b. More specifically, the hour number line chain 106 comprise a pair of end hour links 1134, 1136 forming the free ends 106a and 106b of the hour number line chain 106 and a plurality of intermediate hour links 1132 coupled therebetween. For example, the hour number line chain 106 may include ten intermediate hour links 1132 and two end hour links 1134, 1136, each hour link corresponding to a one-hour interval of time within a span of 12 hours. In the illustrated embodiment, for example, the ten intermediate hour links 1132 correspond, respectively, to the hours from two o'clock to eleven o'clock and the two end hour links 1134, 1136 correspond, respectively, to one o'clock and twelve o'clock.

As described below, adjacent intermediate hour links 1132 are pivotably connected to one another (via pivot joints 1192 located proximate their upper or radially upward ends) and to the end hour links 1134, 1136 (via pivot joints 1226 and 1276 located proximate their upper or radially upward ends) to allow the hour number line chain 106 to be selectively arranged into an annular shape or a substantially linear shape. In the illustrated embodiments, adjacent intermediate hour links 1132 are pivotably connected to one another and to the end hour links 1134, 1136 in a secure manner that prevents inadvertent removal of the intermediate hour links 1132 from the hour number line chain 106 during normal use. The end hour links 1134, 1136 are removably coupled to one another to connect the free ends 106a and 106b of the hour number line chain 106 in a closed loop when the hour number line chain 106 is arranged in its annular shape.

The illustrated hour number line chain 106 is configured such that when the hour number line chain 106 is arranged in its annular shape on the base 102, the pivots joints 1192, 1226, 1276 pivotably connecting the hour links 1130 of the hour number line chain are located beneath and spaced on approximately the same the circle C as the pivots joints 192, 226, 276 pivotably connecting the minute links 130 of the minute number line chain 104. In addition, the pivots joints 1192, 1226, 1276 pivotably connecting the hour links 1130 may be spaced equidistant from one another by a linear distance a2 (as described below) that is approximately equal to the linear distance a1 between the pivots joints 192, 226, 276 pivotably connecting the minute links 130. As a result, the hour number line chain 106 can have approximately the same length L as the minute number line chain 104 when arranged into their substantially linear shapes.

A first set of clock indicia 1138 corresponding to hours is provided on the front or clock side faces 1130a of the hour links 1130 of the hour number line chain 106 so as to be visible when the hour number line chain 106 is coupled to the base 102. The hour clock indicia 1138 may be divided, for example, into one-hour intervals within a span of 12 hours, including numerical indicia corresponding to the numerals 1 to 12 and indicia marks corresponding to each hour. In the illustrated embodiment, the numerical indicia and the indicia mark corresponding to the numeral 1 are provided on the front face 1130a of the first end hour link 1134, the numerical indicia and the indicia mark corresponding to the numeral 12 are provided on the front face 1130a of the second end hour link 1136, and the numerical indicia and the indicia marks corresponding to the numerals 2 to 11 are provided on the front faces 1130a of the intermediate hour links 1132. The numerical indicia of the hour clock indicia 1138 may be arranged on the front faces 1130a so as to be oriented in substantially the same direction as one another corresponding to hours on an analog clock face when the hour number line chain 106 is arranged in an annular shape. In the illustrated embodiment, when the annular-shaped hour number line chain 106 is coupled to the base 102, the numerical indicia of the hour clock indicia 1138 are each oriented on the front faces 1130a of the hour links 1130 in a substantially vertical or upright direction relative to a support surface on which the base 102 rests.

In addition, a second set of number line indicia 1140 corresponding to hours is provided on the rear or number line faces 1130b of the hour links 1130 opposite the front faces 1130a so as to visible when the hour number line chain 106 is removed from the base 102. The hour number line indicia 1140 are also divided, for example, into one-hour intervals within a span of 12 hours, including numerical indicia corresponding to the numerals 0 to 12 and indicia marks, for example straight line segments, corresponding to each numeral 0 to 11. In the illustrated embodiment, the numerical indicia and the indicia mark corresponding to the numeral 0 are provided on the rear face 1130b of the second end hour link 1136, the numerical indicia and the indicia mark corresponding to the numerals 11 and 12 are provided on the rear face 1130b of the second end hour link 1136, and the numerical indicia and the indicia marks corresponding to the numerals 1 to 10 are provided on the rear faces 1130b of the intermediate hour links 1132. The numerical indicia of the hour number line indicia 1140 may be arranged on the rear faces 1130b so to be oriented in substantially the same direction as one another corresponding to hours on a number line when the hour number line chain 106 is arranged in a substantially linear shape. In the illustrated embodiment, the numerical indicia of the hour number line indicia 1140 are each oriented on the rear faces 1130b in a direction that is perpendicular to a longitudinal axis of the hour number line chain 106 arranged in a substantially linear shape.

In some embodiments, the clock 100 may be provided with two hour number line chains 106, each of which has hour clock indicia 1138 and hour number line indicia 1140 that include numerical indicia corresponding to the numerals 0 to 12 and can be removably coupled to the base 102 one at a time and is interchangeable with the other. The two hour number line chains 106 may be used to teach concepts for telling time using the ante meridiem ("AM") and post meridiem ("PM") time conventions, including the concept that elapsed time can begin in the PM and end in the AM.

In some embodiments, the clock 100 may be used to teach concepts for telling time in a 24-hour format. For example, the clock 100 may be provided with two hour number line chains 106, each of which can be removably coupled to the base 102 one at a time and is interchangeable with the other. Each of the first and second hour number line chains 106 may have a first set of hour clock indicia 1138 that includes both numerical indicia corresponding to the numerals 1 to 12 and numerical indicia corresponding to the numerals 13 to 24. In particular, numerical indicia corresponding to the pair of numerals 1 and 13 may be provided on the front face 1130a of the first end hour link 1134, numerical indicia corresponding to the pair of numerals 12 and 24 may be provided on the front face 1130a of the second end hour link 1136, and numerical indicia corresponding to the pairs of numerals including 2 and 14, 3 and 15, 4 and 16, 5 and 17, 6 and 18, 7 and 19, 8 and 20, 9 and 21, 10 and 22, and 11 and 23 are provided on the front face 1130a of one of the intermediate hour links 1132.

In addition, the hour number line indicia 1140 provided on the rear or number line faces 1130*b* of the hour links 1130 of the first hour number line chain 106 may include numerical indicia corresponding to the numerals 0 to 12 and indicia marks, for example straight line segments, corresponding to each numeral 1 to 12, as described above. In contrast, the hour number line indicia 1140 provided on the rear or number line faces 1130*b* of the hour links 1130 of the second hour number line chain 106 may include may include numerical indicia corresponding to the numerals 12 to 24 and indicia marks, for example straight line segments, corresponding to each numeral 12 to 23. In particular, the numerical indicia and the indicia mark corresponding to the numeral 12 may be provided on the rear face 1130*b* of the second end hour link 1136, the numerical indicia and the indicia mark corresponding to the numerals 23 and 24 may be provided on the rear face 1130*b* of the second end hour link 1136, and the numerical indicia and the indicia marks corresponding to the numerals 13 to 22 are provided on the rear faces 1130*b* of the intermediate hour links 1132.

The first set of clock indicia 1138 and the second set of number line indicia 1140 may be printed on the hour links 1130, for example, by pad printing or screen printing, or may be formed integrally with the hour links 1130. In some embodiments, the first set of clock indicia 1138 and the second set of number line indicia 1140 each may be color coded to show groups of five on the hour number line chain 106, thereby making it easier for children to visually recognize different hours. For example, each set of hour lock indicia 1138, 1140, may be formed using alternating colors or shades of color for different hour indicia.

The Intermediate Links of the Hour Number Line Chain

Referring to FIGS. 20-25, each intermediate hour link 1132 may include a pair of oppositely facing first and second intermediate hour link tiles 1142, 1146 that are fixedly attached to one another. In addition, each intermediate hour link 1132 may be provided with a pivot connector 1148 that is secured between the first and second intermediate hour link tiles 1142, 1146.

In the illustrated embodiment, each first intermediate hour link tile 1142 has a body 1150 and a shoulder portion 1154 that extends laterally therefrom. Likewise, each second intermediate hour link tile 1146 has a body 1152 and a shoulder portion 1156 that extends laterally therefrom.

Figure 22:
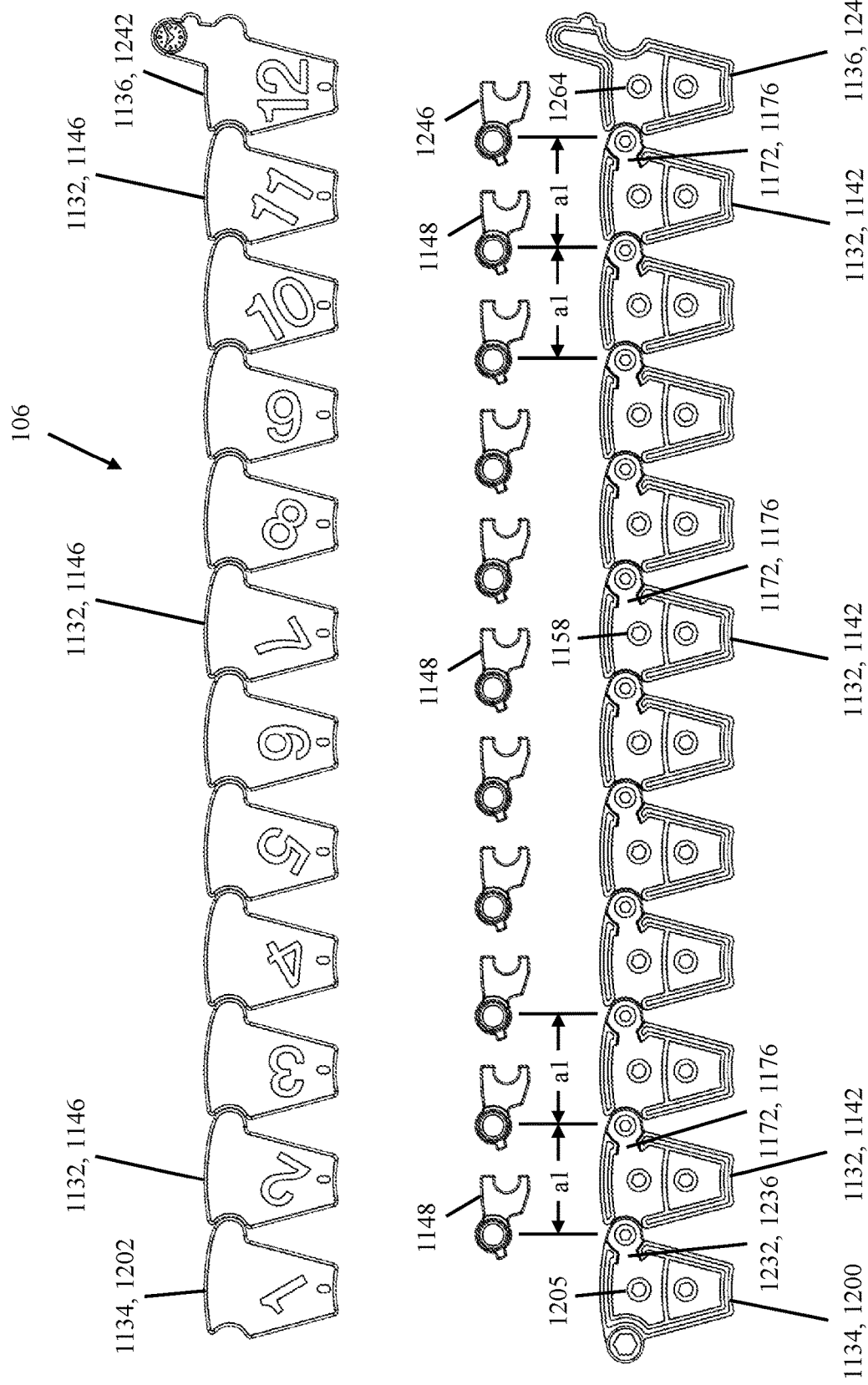
FIG. 22 is a view of the hour number line chain of FIG. 21 in an unassembled state.
Figure 23:
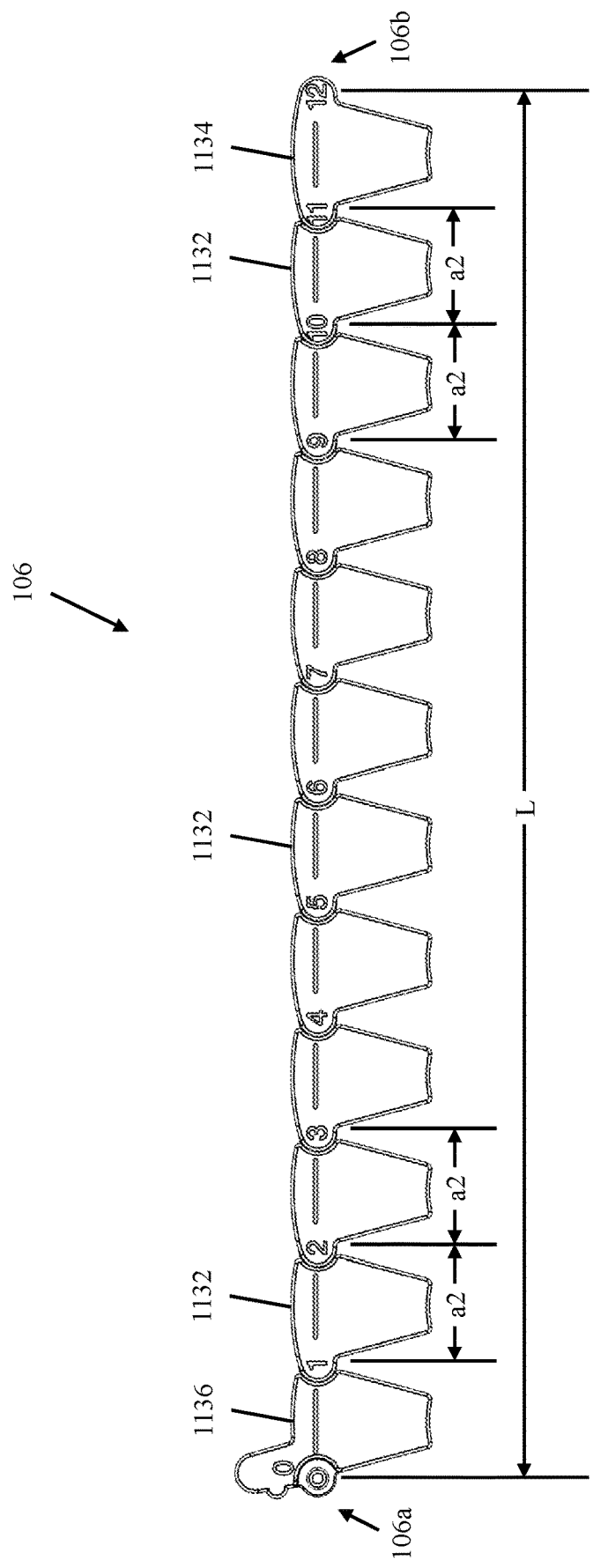
FIG. 23 is a rear view of the hour number line chain of FIG. 20.
Figure 24:
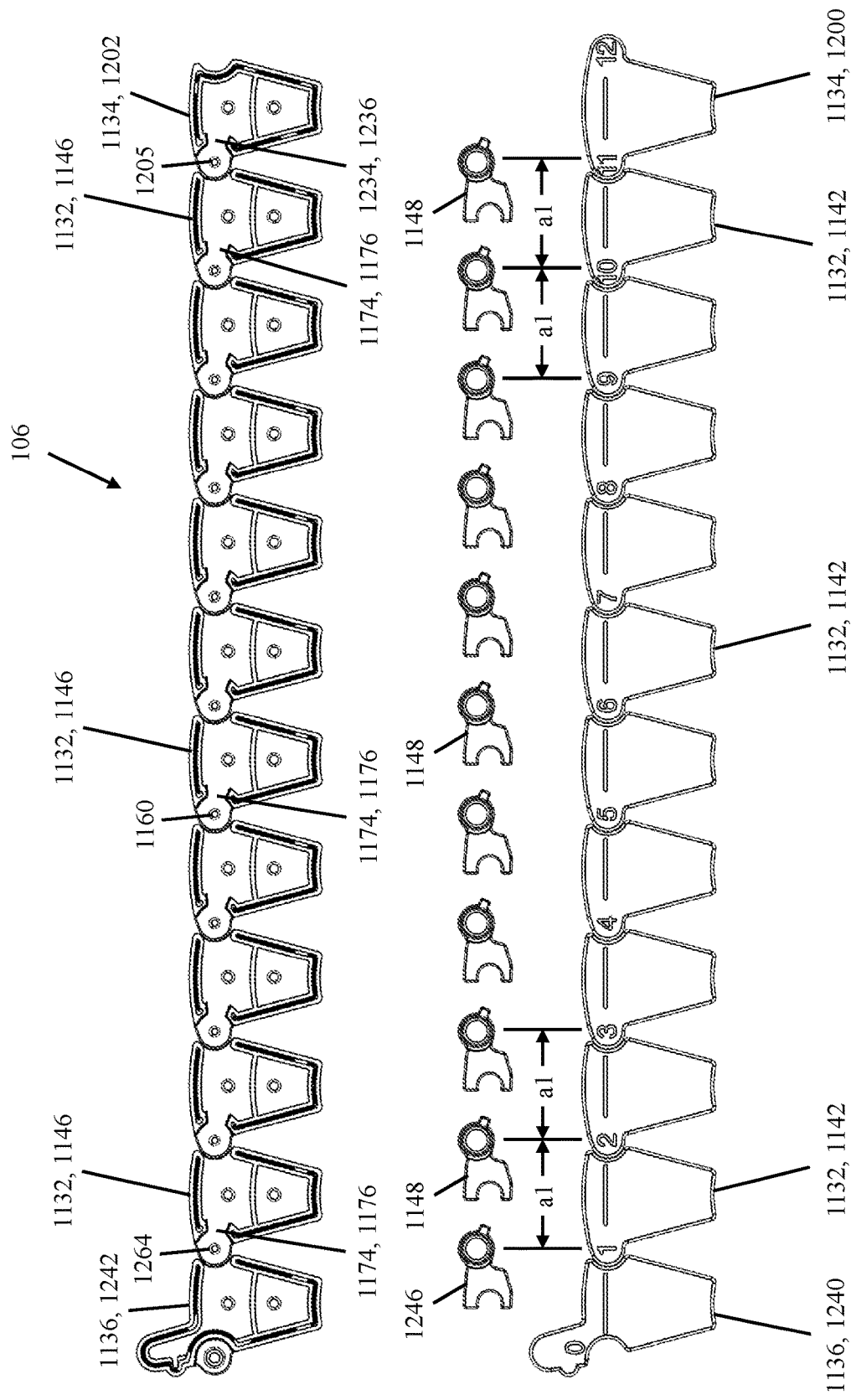
FIG. 24 is a view of the hour number line chain of FIG. 23 in an unassembled state.
Figure 25:
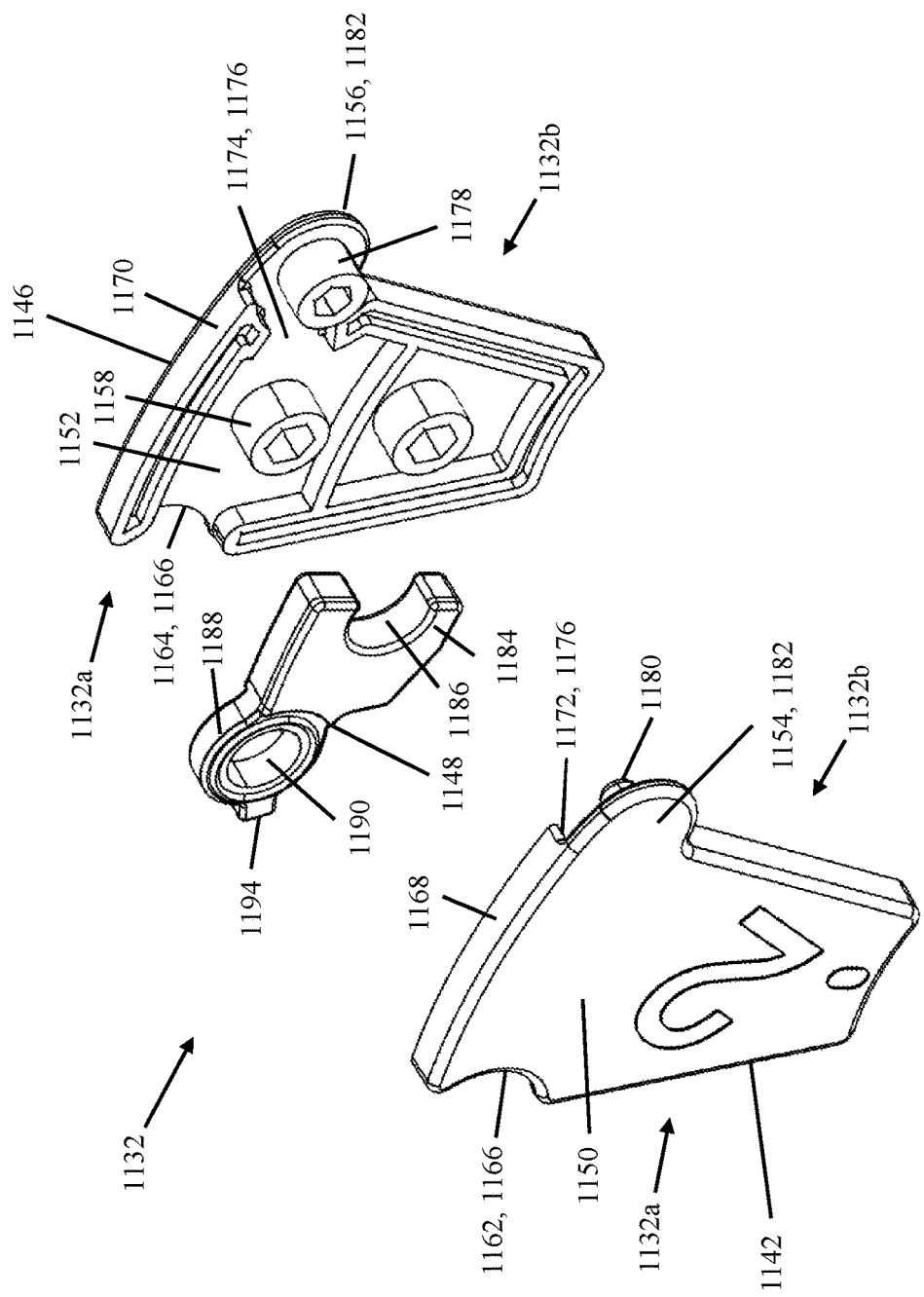
FIG. 25 is an exploded perspective view of an intermediate hour link of the hour number line chain of the educational clock of FIG. 1.
Figure 26:
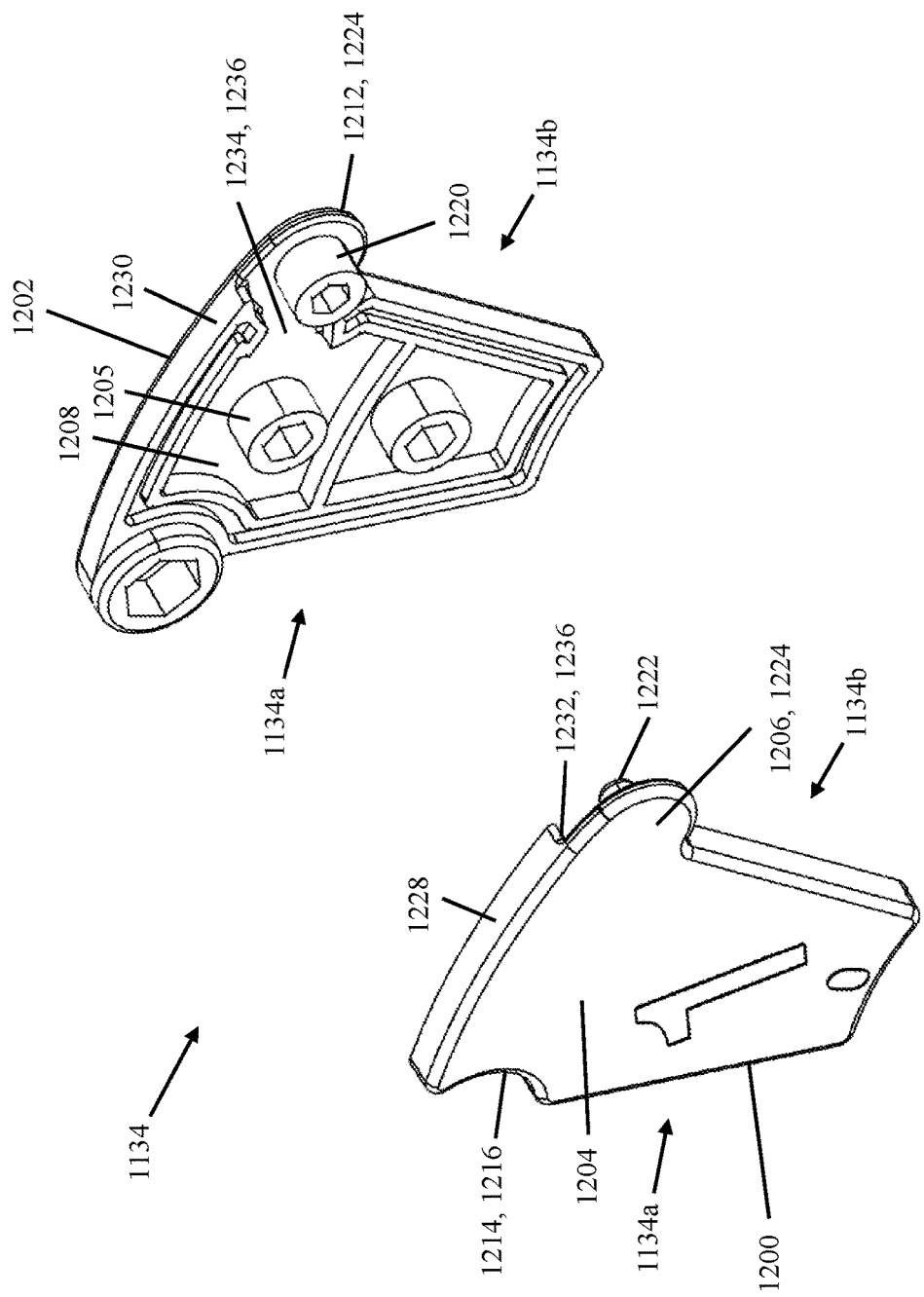
FIG. 26 is an exploded perspective view of a first end hour link of the hour number line chain of the educational clock of FIG. 1.
Figure 27:
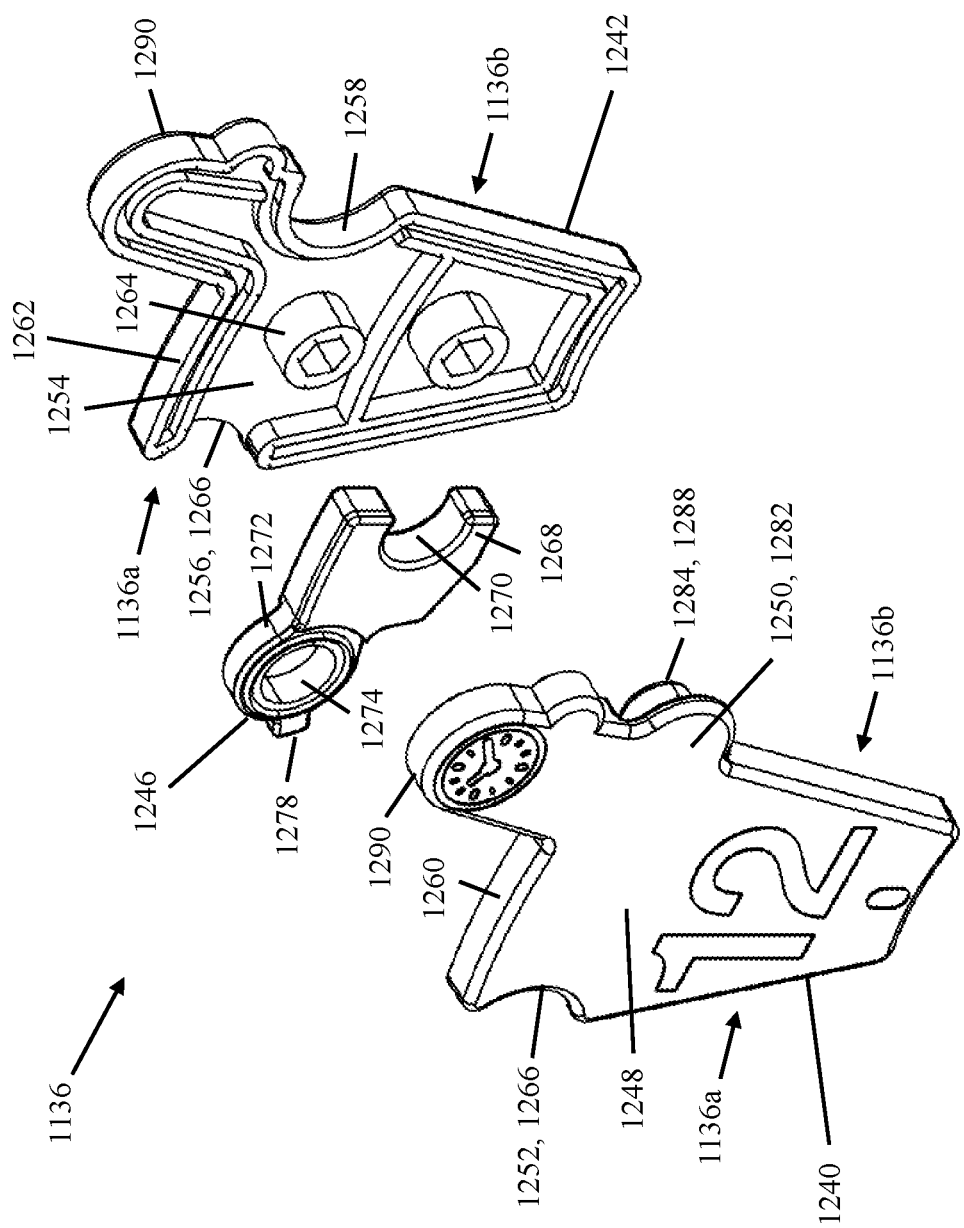
FIG. 27 is an exploded perspective view of a second end hour link of the hour number line chain of the educational clock of FIG. 1.

The body 1150 of a first intermediate hour link tile 1142 mates with the body 1152 of a second intermediate hour link tile 1146 via a set of mating features so as to locate the first and second tiles with respect to each other and to secure them together. For example, as shown in FIGS. 22, 24 and 25, one or more tubular connecting bosses 1158 may be arranged on an interior surface of the body 1150, 1152 of at least one of the first intermediate hour link tile 1142 and/or the second intermediate hour link tile 1146. The connecting bosses 1158 project substantially perpendicular from the interior surface and are aligned with connecting pins 1160 arranged on an interior surface of the body 1150, 1152 of the other intermediate hour link tile 1142, 1146. The connecting pins 1160 project substantially perpendicular from the interior surface of the other intermediate hour link tile and are received in the connecting bosses 1158 via a press fit, a snap-fit, or any other assembly method suitable for securing a pair of first and second intermediate hour link tiles 1142, 1146 together.

The body 1150, 1152 of each first and second intermediate hour link tile 1142, 1146 defines an indented cutout portion 1162, 1164 along its periphery. When a pair of first and second intermediate hour link tiles 1142, 1146 are attached to one another to form an intermediate hour link 1132, the indented cutout portions 1162, 1164 cooperate to form a receiving area 1166 at an upper end of a first lateral side 1132*a* of the intermediate hour link 1132. The receiving area 1166 rotatably receives therein a connecting portion 1182 formed by the mated shoulder portions 1154, 1156 of the first and second intermediate hour link tiles 1142, 1146 of an adjacent intermediate hour link 1132 (as described below).

As shown in FIG. 25, peripheral sidewalls 1168, 1170 extend substantially perpendicularly from the bodies 1150, 1152 of the first and second intermediate hour link tiles 1142, 1146. Each peripheral sidewall 1168, 1170 include a slotted opening 1172, 1174 that extends therethrough adjacent the shoulder portion 1154, 1156 of the intermediate hour link tile. The slotted openings of the first and second tiles of each intermediate hour link 1132 are aligned with each other and together form a pivot stop aperture 1176 of the intermediate hour link 1132 proximate the connecting portion 1182 when a pair of first and second intermediate hour link tiles are disposed in a mated relationship with one another. The pivot stop aperture 1176 is shaped and sized so that the arm member (described below) of the pivot connector 1148 of an adjacent intermediate hour link 1132 can engage therein for limiting the range of rotation of respective adjacent intermediate hour links 1132 relative to each other. In the illustrated embodiment, as described below, the pivot stop aperture limits 1176 the range of rotation of adjacent intermediate hour links 1132 relative to one another to about 30 degrees such that the pivot angle between adjacent intermediate hour links 1132 can be from about 180 degrees to about 150 degrees.

The shoulder portion 1154 of a first intermediate hour link tile 1142 is also configured to mate with the shoulder portion 1156 of a second intermediate hour link tile 1146. In particular, a tubular hinge boss 1178 is arranged on an interior surface of the shoulder portion 1154, 1156 of the first or second intermediate hour link tile 1142, 1146. The hinge boss 1178 projects substantially perpendicular from the interior surface and is aligned with a hinge pin 1180 that is arranged on the interior surface of the shoulder portion 1154, 1156 of the other intermediate hour link tile. The hinge pin 1180 projects substantially perpendicular from the interior surface of the other intermediate hour link tile and are received in the hinge boss 1178 via a press fit, a snap-fit, or any other assembly method suitable for securing a pair of first and second intermediate hour link tiles 1142, 1146 together.

The mated shoulder portions 1154, 1156 cooperate to form a connecting portion 1182 at an upper end of a second lateral side 1132*b* of the intermediate hour link 1132 that is opposite the first lateral side 1132*a*. The shoulder portions 1154, 1156 have an arcuate peripheral shape that is complementary to an arcuate peripheral shape of the indented cutout portions 1162, 1164 of the intermediate hour link tile 1142, 1146. As a result, the connecting portion 1182 of an intermediate hour link 1132 can be rotatably received in the receiving area 1166 of an adjacent intermediate hour link 1132.

The pivot connector 1148 of each intermediate hour link 1132 is configured to pivotably connect the link to an adjacent intermediate hour link 1132 (or an adjacent end hour link 1134, 1136, as described further below). In the illustrated embodiment, for example, the pivot connector 1148 may have a retaining section 1184 shaped and sized to fit securely within and against the sidewalls 1168, 1170 of the intermediate hour link 1132. In addition, one or more pin holes 1186 may be formed in the retaining section 1184, each pin hole 1186 being shaped, sized and spaced to at least partially receive and retain a connecting boss 1158 and/or a connecting pin 1160 of the intermediate hour link 1132. When a pair of first and second intermediate hour link tiles 1142, 1146 of the intermediate hour link 1132 are attached together, the connecting boss 1158 and the connecting pin 1160 engage in the pin hole 1186 to help retain the pivot connector 1148 in position between the intermediate hour link tiles.

The pivot connector 1148 also includes an arm member 1188 connected to the retaining section 1184. The arm member 1188 extends outwardly past the periphery of the first and second intermediate hour link tiles 1142, 1146 and into the receiving area 1166 formed at the upper end of the first lateral side 1132a of the intermediate hour link 1132 when the pivot connector 1148 is secured between the intermediate hour link tiles as described above. As a result, the arm member 1188 can be received between the mated shoulder portions 1154, 1156 of the first and second intermediate hour link tiles 1142, 1146 of an adjacent intermediate hour link 1132.

The arm member 1188 is pivotably coupled to the connecting portion 1182 of an adjacent intermediate hour link 1132 via a pivot hole 1190 formed through the arm member 1188. The pivot hole 1190 is spaced in axial alignment with the hinge boss 1178 and the hinge pin 1180 of the adjacent intermediate hour link 1132 and is shaped and sized to rotatably receive the hinge boss 1178 and the hinge pin 1180 therein. Together, the arm member 1188 of the intermediate hour link 1132 and the connecting portion 1182 of an adjacent intermediate hour link 1132 form a pivot joint 1192 for pivotably connecting the intermediate hour links 1132 to each other. The pivot joints 1192 formed by adjacent pairs of adjacent intermediate links 1132 are located proximate the upper or radially upward ends of the intermediate hour links 1132 and are spaced from one another by a linear distance a2. In the illustrated embodiment, the linear distance a2 between adjacent pivot joints 1192 is approximately equal to the linear distance a1 between adjacent pivot joints 192 of the minute number line chain 104.

In addition, a stop tab 1194 is formed near a distal end of the arm member 1188 of each pivot connector 1148 and protrudes radially away from the pivot hole 1190 of the arm member 1188. The stop tab 1194 is configured to extend into the pivot stop aperture 1176 of an adjacent intermediate hour link 1132 when the arm member 1188 is pivotably coupled to the connecting portion 1182 of the adjacent intermediate hour link. As the pivot connector 1148, including the arm member 1188, pivots about the hinge boss 1178 of the adjacent intermediate hour link, the stop tab 1194 rotates within the pivot stop aperture 1176 of the adjacent intermediate hour link 1132 toward engagement with one of the peripheral sidewalls 1168, 1170 so as to limit rotation of the intermediate hour link 1132 relative to the adjacent intermediate hour link 1132. As a result, when the hour number line chain 106 is assembled with adjacent intermediate hour links 1132 pivotably connected together, the stop tab 1194 of one intermediate link and the pivot stop aperture 1176 of an adjacent intermediate hour links 1132 cooperate to limit the range of rotation of the pivot joint 1192 formed between the pair of intermediate links. In the illustrated embodiment, the range of rotation of the pivot joint 1192 between adjacent intermediate hour links 1132 is about 30 degrees such that the pivot angle between them can range from about 180 degrees to about 150 degrees.

The End Links of the Hour Number Line Chain

Referring to FIGS. 20-24 and 26-27, the end hour links 1134, 1136 of the hour number line chain 106 may include one or more of the features described above for the intermediate hour links, however the end hour links 1134, 1136 are configured to be removably coupled to each other.

In the illustrated embodiment, the first end hour link 1134 corresponding to one o'clock includes a pair of oppositely facing first and second end hour link tiles 1200, 1202 that are fixedly attached to one another. The first end hour link tile 1200 has a body 1204 and a shoulder portion 1206 that extends laterally therefrom. The second end hour link tile 1202 has a body 1208 and two shoulder portions 1210, 1212 that extend laterally from the body on opposite sides thereof.

The body 1204 of the first end hour link tile 1200 is configured to mate with the body 1208 of the second end hour link tile 1202. In particular, the body 1204 and the body 1208 may be provided with mating features 1205, such as connecting bosses and pins or snaps, to locate the first end hour link tile 1200 and the second end hour link tile 1202 with respect to each other and to secure them together.

The body 1204 of the first end hour link tile 1200 defines an indented cutout portion 1214 along its periphery opposite the shoulder portion 1206. When the first end hour link tile 1200 and the second end hour link tile 1202 are attached to one another to form the first end hour link 1134, the indented cutout portion 1214 of the first end hour link tile 1200 and the first shoulder portion 1210 of the second end hour link tile 1202 cooperate to form a receiving area 1216 at an upper end of a first lateral side 1134a of the first end hour link 1134. The receiving area 1216 removably receives a connecting portion 1218 of the second end hour link 1136 (as described below).

The shoulder portion 1206 of the first end hour link tile 1200 and the second shoulder portion 1212 of the second end hour link tile 1202 are also configured to mate with each other. In the illustrated embodiment, for example, a tubular hinge boss 1220 may be arranged on an interior surface of either the shoulder portion 1206 of the first end hour link tile 1200 or the second shoulder portion 1212 of the second end hour link tile 1202. The hinge boss 1220 projects substantially perpendicular from the interior surface and is aligned with a hinge pin 1222 arranged on the interior surface of the other shoulder portion 1206, 1212. The hinge pin 1222 projects substantially perpendicular from the interior surface of the other shoulder portion and is received in the hinge boss 1220 via a press fit, a snap-fit, or any other assembly method suitable for securing the first end hour link tile 1200 and the second end hour link tile 1202 together.

The shoulder portion 1206 of the first end hour link tile 1200 and the second shoulder portion 1212 of the second end hour link tile 1202 cooperate to form a connecting portion 1224 at an upper end of a second lateral side 1134b of the first end hour link 1134 that is opposite the first lateral side 1134a. The shoulder portions 1206, 1212 have an arcuate peripheral shape that is complementary to an arcuate peripheral shape of the indented cutout portions 1162, 1164 of the intermediate hour links 1132. As a result, the connecting portion 1224 of the first end hour link 1134 can be rotatably received in the receiving area 1166 of an adjacent intermediate hour link 1132.

In order to pivotably connect the end hour link 1134 to an adjacent intermediate hour link 1132, the arm member 1188 of the pivot connector 1148 of the adjacent intermediate link 1132 is pivotably coupled to the connecting portion 1224 of the first end hour link 1134. In particular, the arm member 1188 is received between the mated shoulder portions 1206, 1212 of the first end hour link 1134. The hinge boss 1220 of the first end hour link 1134 is inserted through the pivot hole 1190 formed through the arm member 1188 of the adjacent intermediate link 1132 so as to be rotatably received therein. Together, the arm member 1188 of the intermediate hour link 1132 and the connecting portion 1224 of the first end hour link 1134 form a pivot joint 1226 for pivotably connecting the adjacent intermediate hour link 1132 and the first end hour link 1134 to each other. The pivot joint 1226 formed between the first end hour link 1134 and the adjacent intermediate hour link 1132 is located proximate the upper or radially upward ends of the first end hour link 1134 and the adjacent intermediate hour link 1132 and is spaced from the other pivot joint 1192 formed in part by the adjacent intermediate link 1132 by the same linear distance a2 as between adjacent pivot joints 1192.

Peripheral sidewalls 1228, 1230 extend substantially perpendicularly from the body 1204 of the first end hour link tile 1200 and the body 1208 of the second end hour link tile 1202 of the first end hour link 1134. Each peripheral sidewall 1228, 1230 include a slotted opening 1232, 1234 that extends therethrough. The slotted openings 1232, 1234 are aligned with each other and together form a pivot stop aperture 1236 of the first end hour link 1134 proximate the connecting portion 1224 when the first end hour link tile 1200 and the second end hour link tile 1202 are disposed in a mated relationship with one another. The pivot stop aperture 1236 is shaped and sized so that the arm member 1188 of an adjacent intermediate link 1132 can engage therein for limiting the range of rotation of the first end hour link 1134 and the adjacent intermediate hour link 1132 relative to each other. In the illustrated embodiment, the pivot stop aperture 1236 limits the range of rotation of the first end hour link 1134 and the adjacent intermediate hour link 1132 to about 30 degrees such that the pivot angle between them can be from about 180 degrees to about 150 degrees.

The second end hour link 1136 corresponding to twelve o'clock may include a pair of oppositely facing first and second end hour link tiles 1240, 1242 that are fixedly attached to one another and a pivot connector 1246 that is secured between the end hour link tiles 1240, 1242.

The first end hour link tile 1240 has a body 1248 and a shoulder portion 1250 that extends laterally therefrom. The body 1248 of the first end hour link tile 1240 defines an indented cutout portion 1252 along its periphery opposite the shoulder portion 1250. The second end hour link tile 1242 has a body 1254 that defines two indented cutout portions 1256, 1258 along its periphery on opposite sides thereof. Peripheral sidewalls 1260, 1262 extend substantially perpendicularly from the body 1248 of the first end hour link tile 1240 and the body 1254 of the second end hour link tile 1242.

The body 1248 of the first end hour link tile 1240 is configured to mate with the body 1254 of the second end hour link tile 1242. In particular, the body 1248 and the body 1254 may be provided with mating features 1264, such as connecting bosses and pins or snaps, to locate the first end hour link tile 1240 and the second end hour link tile 1242 with respect to each other and to secure them together.

When the first end hour link tile 1240 and the second end hour link tile 1242 are attached to one another to form the second end hour link 1136, the indented cutout portion 1252 of the first end hour link tile 1240 and the first indented cutout portion 1256 of the second end hour link tile 1242 cooperate to form a receiving area 1266 at an upper end of a first lateral side 1136a of the second end hour link 1136. The receiving area 1266 rotatably receives therein a connecting portion 1182 of an adjacent intermediate hour link 1132.

The pivot connector 1246 of the second end hour link 1136 is configured to pivotably connect the link to an adjacent intermediate hour link 1132. In the illustrated embodiment, for example, the pivot connector 1246 may have a retaining section 1268 shaped and sized to fit securely within and against the sidewalls 1260, 1262 of the second end hour link 1136. In addition, one or more pin holes 1270 may be formed in the retaining section 1268, each pin hole 1270 being shaped, sized and spaced to at least partially receive and retain a mating feature 1264 of the second end hour link 1136. When the first and second end hour link tiles 1240, 1242 of the second end hour link 1136 are attached together, the mating feature 1264 engages in the pin hole 1270 to help retain the pivot connector 1246 in position between the end hour link tiles.

The pivot connector 1246 also includes an arm member 1272 connected to the retaining section 1268. The arm member 1272 extends outwardly past the periphery of the first and second end hour link tiles 1240, 1242 and into the receiving area 1266 of the second end hour link 1136 when the pivot connector 1246 is secured between the end hour link tiles as described above. As a result, the arm member 1272 can be received between the mated shoulder portions 1154, 1156 of the first and second intermediate hour link tiles 1142, 1146 of an adjacent intermediate hour link 1132.

The arm member 1272 is pivotably coupled to the connecting portion 1182 of an adjacent intermediate hour link 1132 via a pivot hole 1274 formed through the arm member 1272. The pivot hole 1274 is spaced in axial alignment with the hinge boss 178 and the hinge pin 180 of the adjacent intermediate hour link 1132 and is shaped and sized to rotatably receive the hinge boss 1178 and the hinge pin 1180 therein. Together, the arm member 1272 of the second end hour link 1136 and the connecting portion 1182 of an adjacent intermediate hour link 1132 form a pivot joint 1276 for pivotably connecting the second end hour link 1136 and the adjacent intermediate hour link 1132 to each other. The pivot joint 1276 formed between the second end hour link 1136 and the adjacent intermediate hour link 1132 is located proximate the upper or radially upward ends of the second end hour link 1136 and the adjacent intermediate hour link 1132 and is spaced from the other pivot joint 1192 formed in part by the adjacent intermediate link 1132 by the same linear distance a2 as between adjacent pivot joints 1192.

In addition, a stop tab 1278 is formed near a distal end of the arm member 1272 of the pivot connector 1246 and protrudes radially away from the pivot hole 1274 of the arm member 1272. The stop tab 1278 is configured to extend into the pivot stop aperture 1176 of an adjacent intermediate hour link 1132 when the arm member 1272 is pivotably coupled to the connecting portion 1182 of the adjacent intermediate hour link. As the pivot connector 1246, including the arm member 1272, pivots about the hinge boss 1178 of the adjacent intermediate hour link, the stop tab 1278 rotates within the pivot stop aperture 1176 of the adjacent intermediate hour link 1132 toward engagement with one of the peripheral sidewalls 1168, 1170 so as to limit rotation of the second end hour link 1136 relative to the adjacent intermediate hour link 1132. As a result, when the hour number line chain 106 is assembled with the second end hour link 1136 pivotably connected to an adjacent intermediate hour link 1132, the stop tab 1278 of the second end hour link 1136 and the pivot stop aperture 1176 of the adjacent intermediate hour link 1132 cooperate to limit the range of rotation of the pivot joint 1276 formed between the pair of intermediate links. In the illustrated embodiment, the range of rotation of the pivot joint 1276 between the second end hour link 1136 and an adjacent intermediate hour link 1132 is about 30 degrees such that the pivot angle between them can range from about 180 degrees to about 150 degrees.

The shoulder portion 1250 of the first end hour link tile 1240 and the second indented cutout portion 1258 of the second end hour link tile 1242 form a connecting portion 1282 at an upper end of the second lateral side 1136b of the second end hour link 1136 that is opposite the first lateral side 1136a. More specifically, the shoulder portion 1250 is configured to be received in the receiving area 1216 of the first end hour link 1134, while the second indented cutout portion 1258 is configured to receive therein the first shoulder portion 1210 of the first end hour link 1134. In some embodiments, the shoulder portion 1250 and the second indented cutout portion 1258 may have arcuate peripheral shapes that are complementary to arcuate peripheral shapes of the indented cutout portion 1214 and the first shoulder portion 1210 of the first end hour link 1134.

In addition, the shoulder portion 1250 of the first end hour link tile 1240 of the second end hour link 1136 and the first shoulder portion 1210 of the second end hour link tile 1202 of the first end hour link 1134 may be provided with a fastening assembly 1284 configured to releasably couple the end hour links 1134, 1136 together when the hour number line chain 106 is arranged in its annular shape. The fastening assembly may include mechanical fasteners, including, but not limited to, snaps, tabs, hooks, clips, clamps, or Velcro, magnetic fasteners, or any other suitable fasteners for releasably coupling the end hour links 1134, 1136 together. In the illustrated embodiment, for example, the fastening assembly includes a tubular retaining boss 1286 and a retaining pin 1288 that are arranged opposite each other, respectively, on the shoulder portion 1250 of the first end hour link tile 1240 of the second end hour link 1136 and the first shoulder portion 1210 of the second end hour link tile 1202 of the first end hour link 1134. The retaining boss 1286 and the retaining pin 1288 may be shaped and sized to be friction fitted together and to be manually separable without the aid of any tools. In other embodiments, the first shoulder portion 1210 of the second end hour link tile 1202 of the first end hour link 1134 may be C-shaped at its distal end so as to form a snap-fit connector around the retaining boss 1286 arranged on the shoulder portion 1250 of the first end hour link tile 1240 of the second end hour link 1136 or vice versa.

The Locating Key of the Hour Number Line Chain

Referring to FIGS. 4-6, 19 and 27, the hour number line chain 106 may include one or more locating features or keys 1290 to locate the hour number line chain 106 in a predetermined orientation on the base 102. The base 102 may include complementary locating features or keyways 294 that cooperate with the keys 1290 so that the hour number line chain 106 can be received by the outer recessed portion 112 of the base 102. In the illustrated embodiment, for example, the first and second end hour link tiles 1240, 1242 of the second end hour link 1136 have protrusions that mate with one another to form a key 1290 at an upper end of the second end hour link 1136. The base 102 has a key slot 294 that is formed in the outer circumferential edge portion 112a of the outer recessed portion 112 and is shaped and sized to fittingly receive the key 1290 therein. However, it would be understood by one of ordinary skill in the art that in other embodiments, for example, the key 1290 and the keyway 1292 may be constructed using other configurations and may be located on other hour links 1130 and other areas of the base 102 while still providing the desired function of locating the hour number line chain 106 in a predetermined orientation on the base 102.

Although the illustrated embodiment includes the minute number line chain 104 and the hour number line chain 106 configured so as to be received, respectively, by the outer recessed portion 112 and the inner recessed portion 114 of the base 102, in other embodiments, the hour number line chain 106 may be configured to be received by outer recessed portion 112 and the minute number line chain 104 may be configured to be received by the inner recessed portion 114.

In some embodiments, the base 102, the minute number line chain 104 and/or the hour number line chain 106 each may include one or more magnets to support its weight and maintain its position when in contact with a support surface (e.g., the base 102 or a whiteboard) that exhibits magnetic characteristics, (e.g., steel, iron) regardless of the orientation of the support surface (e.g., vertically, horizontally, or otherwise). Similarly, the minute hand 108 and/or the hour hand 110 each may also include one or more magnets to support its weight and maintain its position when in contact with such a support surface that exhibits magnetic characteristics. In this way, the base 102, the minute number line chain 104, the hour number line chain 106, the minute hand 108, and/or the hour hand 110 having magnets may be removably and securely displayed on a ferromagnetic surface alone or in combination with one another. Moreover, the magnets may be provided in a manner that does not interfere with the assembly of the magnetic minute number line chain 104, the magnetic hour number line chain 106, the magnetic minute hand 108, and/or the magnetic hour hand 110 on a nonmagnetic base 102 in the manner described above.

In some embodiments, the base 102 and the minute number line chain 104 may include one or more cooperating fastening assemblies configured to releasably couple the minute number line chain 104 to the base 102. Similarly, the base 102 and the hour number line chain 106 may include one or more cooperating fastening assemblies configured to releasably couple the hour number line chain 106 to the base 102. The cooperating fastening assemblies may include mechanical fasteners, including, but not limited to, snaps, tabs, hooks, clips, clamps, or Velcro, magnetic fasteners, or any other suitable fasteners. In other embodiments, the minute number line chain 104 and the hour number line chain 106 may be attached to the base 102 with plastic wrap.

Methods for Teaching Time Using the Educational Clock

According to an exemplary embodiment, the clock 100 may be used to teach children how to tell time to the hour. For example, a child may be instructed to arrange the hour number line chain 106 into a linear shape with the rear faces 1130b of the hour links 1130 (the number line side) facing up and to place the hour hand 110 under a numerical indicia of the hour number line indicia 1140, such as the numerical indicia corresponding to the numeral 4. Then, the child is instructed to move the hour hand 110 halfway between the numerical indicia corresponding to the numeral 4 and the numerical indicia corresponding to the numeral 5. The child may be asked, for example, "What number is the hand pointing to? When does the number change to 5?" In this way, the child is able to learn that the number does not change until the hour hand 110 is directly on or past the numerical indicia corresponding to the numeral 5.

Figure 28:
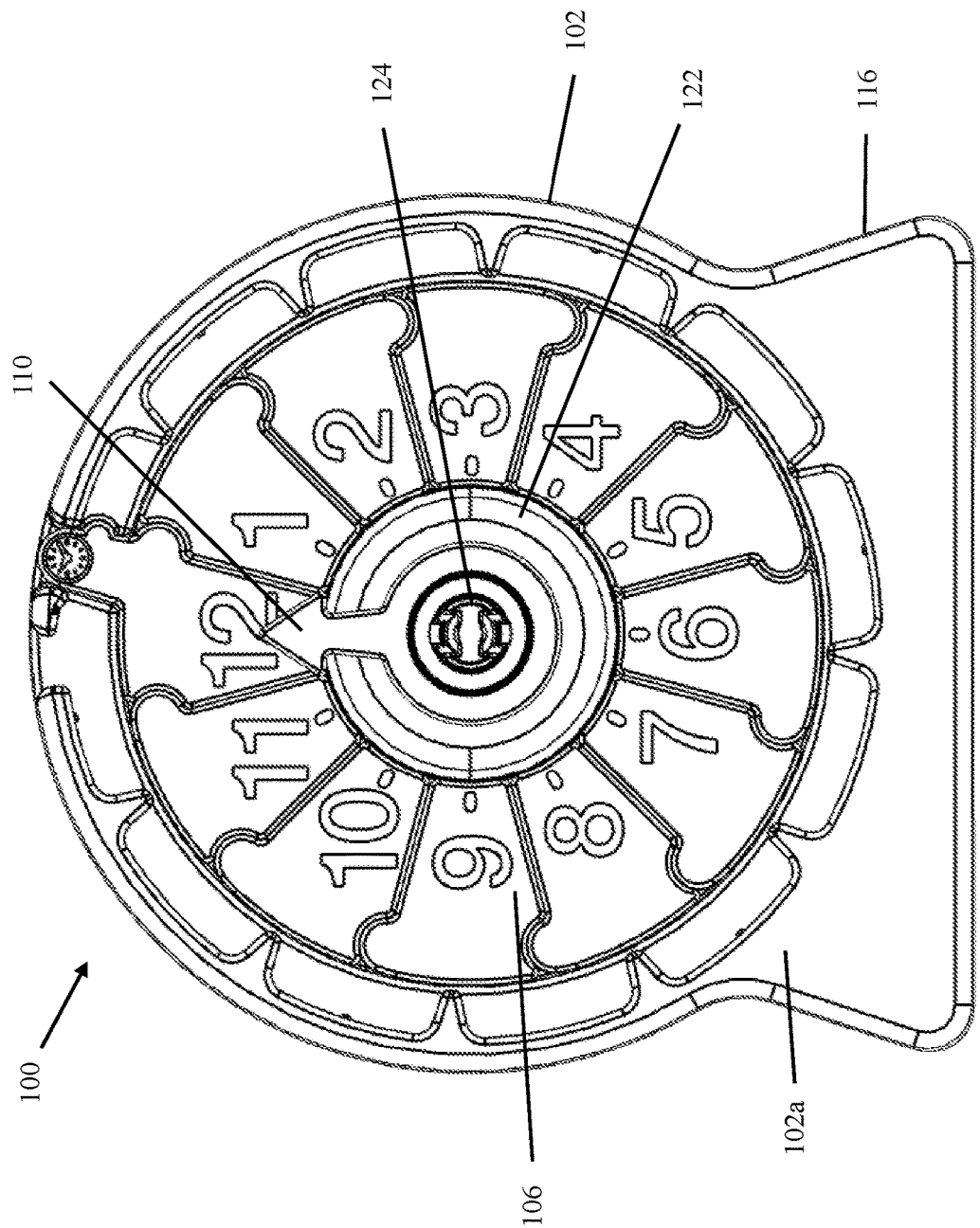
FIG. 28 is a front view of the educational clock of FIG. 1 without the minute number line chain.

Further, the child may be instructed to flip over the hour number line chain 110 with the front faces 1130a of the hour links 1130 (the clock side) facing up and to insert the hour number line chain 110 into the base 102 of the clock and snap on the hour hand 110, as shown in FIG. 28. Then, the child is instructed to rotate the hour hand 110 around the clock. The child may be asked, for example, "What hour is the hand pointing to?" in order to identify the hour that the hour hand 110 is pointing to. In this manner, children can see that the hour notation on a clock face is an extension of a number line and can easily transition from counting to telling time by physically and mentally connecting concepts between a number line and time.

According to another exemplary embodiment, the clock 100 may be used to teach children how to tell time to the minute. For example, a child may be instructed to arrange the minute number line chain 104 into a linear shape with the rear faces 130*b* of the minute links 130 (the number line side) facing up and to place the minute hand 108 under a numerical indicia of the minute number line indicia 140, such as the numerical indicia corresponding to 5 minutes past the hour. Then, the child is instructed to skip count by 5's while moving the minute hand 108 to other numerical indicia of the minute number line indicia 140. Next, the child is instructed to place the minute hand 108 under one of the indicia marks of the minute number line indicia 140 corresponding to a minute ranging from 0 to 60 minutes past the hour and to identify the minute that the minute hand 108 is pointing to. The child may be encouraged to use the closest numerical indicia corresponding to a five-minute interval to find the answer.

Figure 29:
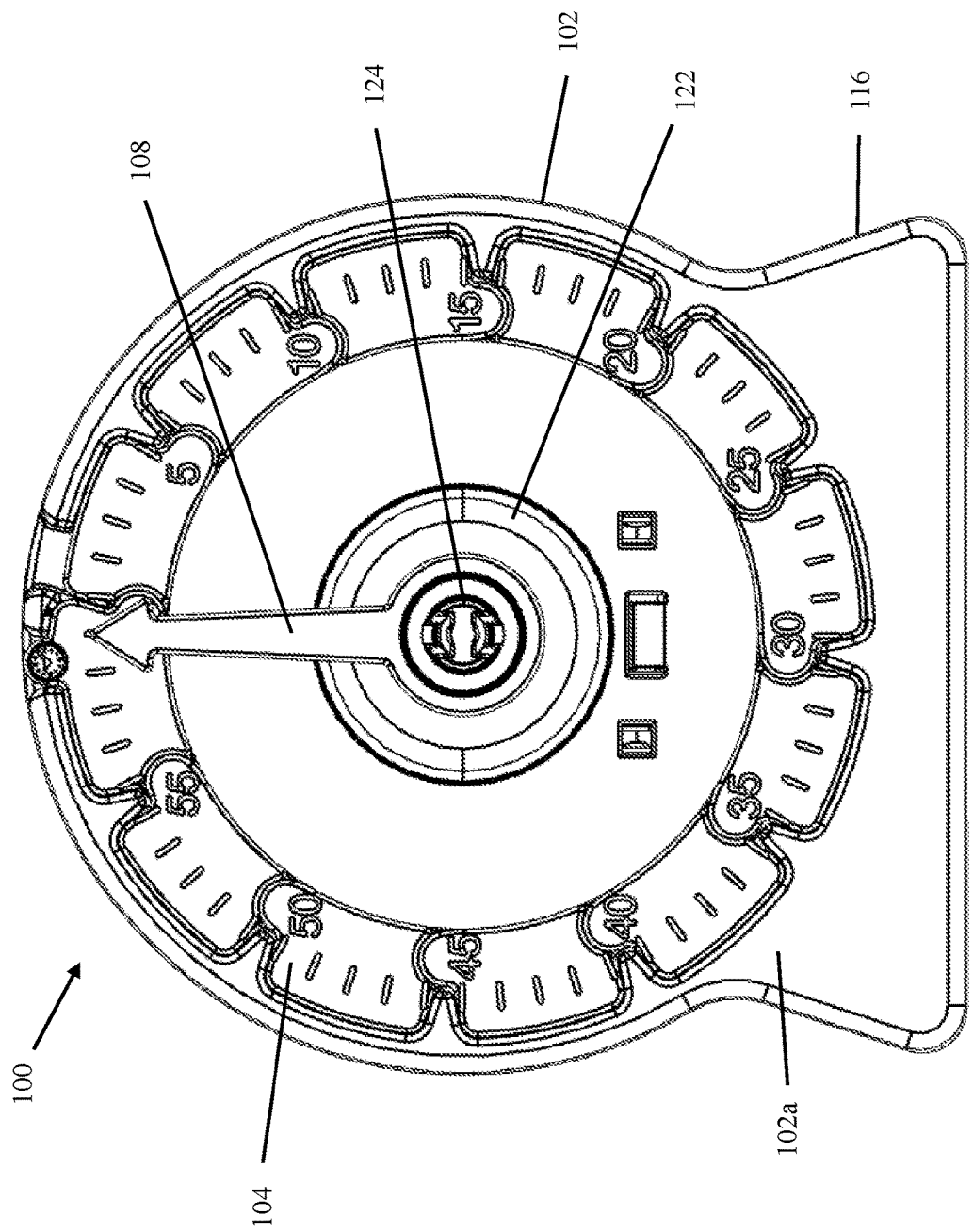
FIG. 29 is a front view of the educational clock of FIG. 1 without the hour number line chain.

Further, the child may be instructed to flip over the minute number line chain 104 with the front faces 130*a* of the minute links 130 (the clock side) facing up and to insert the minute number line chain 104 into the base 102 of the clock and snap on the minute hand 108, as shown in FIG. 29. Then, the child is instructed to rotate the minute hand 108 around the clock. The child may be asked, for example, "What minute is the hand pointing to?" in order to identify the minute that the minute hand 102 is pointing to. In this manner, children can see that the minute notation on a clock face is an extension of a number line and can easily transition from counting to telling time by physically and mentally connecting concepts between a number line and time.

According to another exemplary embodiment, the clock 100 may be used to teach children how to tell time with hours and minutes. For example, as shown in FIG. 30, a child may be instructed to arrange the hour number line chain 106 into a linear shape with the rear faces 1130*b* of the hour links 1130 (the number line side) facing up and the minute number line chain 104 into a linear shape with the rear faces 130*b* of the minute links 130 (the number line side) facing up. Then, the child is instructed to place the minute number line chain 104 directly below the hour number line chain 106. The child may be asked, for example, "What do you notice about the two number lines? How many minutes are lined up with the 1st hour [2nd hour, 3rd hour . . . ]?" Next, the child is instructed to place the hour hand 110 above the hour number line chain 106 pointing down to a numerical indicia of the hour number line indicia 1140 and to place the minute hand 108 below the minute number line chain 104 pointing up to a numerical indicia of the minute number line indicia 140. The child may be asked, for example, to determine the time and record it in a digital format (HH:MM).

Further, the child may be instructed to flip over the hour number line chain 110 and the minute number line chain 104 with the front faces 1130*a* of the hour links 1130 (the clock side) and the front faces 130*a* of the minute links 130 (the clock side) facing up, and to insert the hour number line chain 110 and the minute number line chain 104 into the base 102 of the clock and snap on the hour hand 110 and the minute hand 108, as shown in FIG. 2. Then, the child is instructed to rotate the hour hand 110 and the minute hand 108 around the clock. The child may be asked, for example, to determine the time.

According to another exemplary embodiment, the clock 100 may be used to teach children how to determine intervals of time or elapsed time. For example, a child may be instructed to arrange the hour number line chain 106 into a linear shape with the rear faces 1130*b* of the hour links 1130 (the number line side) facing up and the minute number line chain 104 into a linear shape with the rear faces 130*b* of the minute links 130 (the number line side) facing up. Then, the child is instructed to place the minute number line chain 104 directly below the hour number line chain 106. Next, the child is instructed to place the hour hand 110 above the hour number line chain 106 pointing down to a numerical indicia of the hour number line indicia 1140, such as the numerical indicia corresponding to the numeral 5, and to place the minute hand 108 below the minute number line chain 104 pointing up to a numerical indicia of the minute number line indicia 140, such as the numerical indicia corresponding to 5 minutes past the hour. The child may be asked, for example, "If it takes ten minutes to drive to a friend's house, at what time will you arrive?" to teach that a ten minute interval of time, in the example above, advances the time from 1:05 to 1:15.

What is claimed is:

1. An educational clock comprising:
    a base;
    a minute number line chain removably coupled to the base, the minute number line chain including a plurality of minute links and a plurality of minute link pivot joints, each minute link pivotably connected to an adjacent minute link at a minute link pivot joint; and
    an hour number line chain removably coupled to the base concentrically with the minute number line chain, the hour number line chain including a plurality of hour links and a plurality of hour link pivot joints, each hour link pivotably connected to an adjacent hour link at an hour link pivot joint,
    wherein the minute link pivot joints and the hour link pivot joints are arranged on a common circle.

2. The educational clock of claim 1, wherein the minute number line chain and the hour number line chain are disposed concentrically on the base.

3. The educational clock of claim 1, wherein the minute number line chain and the hour number line chain partially overlap each other on the base.

4. The educational clock of claim 3, wherein the minute link pivot joints and the hour link pivot joints are located where the minute number line chain and the hour number line chain are overlapping.

5. The educational clock of claim 1,
    wherein the minute number line chain is adjustable between an annular shape configured to removably couple to the base and a linear shape and
    wherein the hour number line chain is adjustable between an annular shape configured to removably couple to the base concentrically with the minute number line chain and a linear shape.

6. The educational clock of claim 5, wherein the minute number line chain and the hour number line chain are approximately the same length when each is in its linear shape.

7. The educational clock of claim 5, further comprising:
a first set of minute clock indicia located on front faces of the minute links including a first set of minute numerical indicia oriented in substantially the same direction as one another when the minute number line chain is arranged in its annular shape;
a second set of minute number line indicia located on rear faces of the minute links opposite the front faces of the minute links including a second set of minute numerical indicia oriented in substantially the same direction as one another when the minute number line chain is arranged in its substantially linear shape;
a first set of hour clock indicia located on front faces of the hour links including a first set of hour numerical indicia oriented in substantially the same direction as one another when the hour number line chain is arranged in an annular shape; and
a second set of hour number line indicia located on rear faces of the hour links opposite the front faces of the hour links including a second set of hour numerical indicia oriented in substantially the same direction as one another when the hour number line chain is arranged in its substantially linear shape.

8. The educational clock of claim 1, wherein the base includes an outer recessed portion configured to receive the minute number line chain therein, an inner recessed portion configured to receive the hour number line chain therein, and an annular step that forms a transition between the outer recessed portion and the inner recessed portion.

9. The educational clock of claim 1, further comprising:
wherein one or more of the minute links each includes a minute link pivot connector that is fixedly secured at a lower end of a first lateral side of the minute link, the lower end being spaced radially inward on the base from an upper end of the first lateral side of the minute link, and is pivotably coupled to an adjacent minute link at one of the minute link pivot joints, and
wherein one or more of the hour links each includes an hour link pivot connector that is fixedly secured at an upper end of a first lateral side of the hour link, the lower end being spaced radially inward on the base from an upper end of the first lateral side of the hour link, and is pivotably coupled to an adjacent hour link at one of the hour link pivot joints.

10. The educational clock of claim 9,
wherein the minute link pivot connector is configured to limit the range of rotation of the minute link and the adjacent minute link relative to each other and
wherein the hour link pivot connector is configured to limit the range of rotation of the hour link and the adjacent hour link relative to each other.

11. The educational clock of claim 1,
wherein the minute links include two end minute links that form free ends of the minute number line chain and are configured to be removably coupled to each other and
wherein the hour links include two end hour links that form free ends of the hour number line chain and are configured to be removably coupled to each other.

12. The educational clock of claim 1, wherein the minute number line chain includes a first key configured to locate the minute number line chain in a predetermined orientation on the base and the hour number line chain includes a second key configured to locate the hour number line chain in a predetermined orientation on the base.

13. An educational clock comprising:
a base;
a minute number line chain removably coupled to the base, the minute number line chain including a plurality of minute links and a plurality of minute link pivot joints, each minute link pivotably connected to an adjacent minute link at a minute link pivot joint; and
an hour number line chain removably coupled to the base, the hour number line chain including a plurality of hour links and a plurality of hour link pivot joints, each hour link pivotably connected to an adjacent hour link at an hour link pivot joint,
wherein the minute number line chain and the hour number line chain are disposed concentrically and partially overlap each other, and
wherein the minute link pivot joints and the hour link pivot joints are located where the minute number line chain and the hour number line chain are overlapping.

14. The educational clock of claim 13, wherein the minute link pivot joints and the hour link pivot joints are arranged on a common circle on the base.

15. The educational clock of claim 13,
wherein the minute number line chain is adjustable between an annular shape configured to removably couple to the base and a linear shape and
wherein the hour number line chain is adjustable between an annular shape configured to removably couple to the base concentrically with the minute number line chain and a linear shape.

16. The educational clock of claim 15, wherein the minute number line chain and the hour number line chain are approximately the same length when each is in its linear shape.

17. The educational clock of claim 15, further comprising:
a first set of minute clock indicia located on front faces of the minute links including a first set of minute numerical indicia oriented in substantially the same direction as one another when the minute number line chain is arranged in its annular shape;
a second set of minute number line indicia located on rear faces of the minute links opposite the front faces of the minute links including a second set of minute numerical indicia oriented in substantially the same direction as one another when the minute number line chain is arranged in its substantially linear shape;
a first set of hour clock indicia located on front faces of the hour links including a first set of hour numerical indicia oriented in substantially the same direction as one another when the hour number line chain is arranged in an annular shape; and
a second set of hour number line indicia located on rear faces of the hour links opposite the front faces of the hour links including a second set of hour numerical indicia oriented in substantially the same direction as one another when the hour number line chain is arranged in its substantially linear shape.

18. The educational clock of claim 13, wherein the base includes an outer recessed portion configured to receive the minute number line chain therein, an inner recessed portion configured to receive the hour number line chain therein, and an annular step that forms a transition between the outer recessed portion and the inner recessed portion.

19. The educational clock of claim 13, further comprising:
wherein one or more of the minute links each includes a minute link pivot connector that is fixedly secured at a lower end of a first lateral side of the minute link, the lower end being spaced radially inward on the base from an upper end of the first lateral side of the minute link, and is pivotably coupled to an adjacent minute link at one of the minute link pivot joints, and wherein one or more of the hour links each includes an hour link pivot connector that is fixedly secured at an upper end of a first lateral side of the hour link, the lower end being spaced radially inward on the base from an upper end of the first lateral side of the hour link, and is pivotably coupled to an adjacent hour link at one of the hour link pivot joints.

20. The educational clock of claim 19, wherein the minute link pivot connector is configured to limit the range of rotation of the minute link and the adjacent minute link relative to each other and wherein the hour link pivot connector is configured to limit the range of rotation of the hour link and the adjacent hour link relative to each other.

21. The educational clock of claim 13, wherein the minute links include two end minute links that form free ends of the minute number line chain and are configured to be removably coupled to each other and wherein the hour links include two end hour links that form free ends of the hour number line chain and are configured to be removably coupled to each other.

22. The educational clock of claim 13, wherein the minute number line chain includes a first key configured to locate the minute number line chain in a predetermined orientation on the base and the hour number line chain includes a second key configured to locate the hour number line chain in a predetermined orientation on the base.

23. The educational clock of claim 13, wherein wherein each minute link is pivotably connected to an adjacent minute link at a minute link pivot joint;

wherein each hour link is pivotably connected to an adjacent hour link at an hour link pivot joint, and wherein each minute link pivot joint and each hour link pivot joint are arranged on a common circle on the base.

24. An educational clock comprising:

a base;

a minute number line chain including a plurality of minute links pivotably connected together; and an hour number line chain including a plurality of hour links pivotably connected together, wherein the minute number line chain is adjustable between an annular shape configured to removably couple to the base and a linear shape, wherein the hour number line chain is adjustable between an annular shape configured to removably couple to the base concentrically with the minute number line chain and a linear shape, and wherein the minute number line chain and the hour number line chain are approximately the same length when each is in its linear shape.

25. The educational clock of claim 24, wherein the minute number line chain and the hour number line chain are disposed concentrically on the base.

26. The educational clock of claim 24, wherein the minute number line chain and the hour number line chain partially overlap each other on the base.

27. The educational clock of claim 26, wherein wherein each minute link is pivotably connected to an adjacent minute link at a minute link pivot joint;

wherein each hour link is pivotably connected to an adjacent hour link at an hour link pivot joint, and wherein each minute link pivot joint and each hour link pivot joint are located where the minute number line chain and the hour number line chain are overlapping.

* * * * *